(12) United States Patent
Newman, Jr. et al.

(10) Patent No.: US 7,779,737 B2
(45) Date of Patent: Aug. 24, 2010

(54) MULTI-AXIS PANEL SAW

(75) Inventors: Robert Charles Newman, Jr., Emmaus, PA (US); Jason O. Adams, Emmaus, PA (US)

(73) Assignee: The Chisel Works, LLC., Emmaus, PA (US)

( * ) Notice: Subject to any disclaimer, the term of this patent is extended or adjusted under 35 U.S.C. 154(b) by 733 days.

(21) Appl. No.: 10/918,609

(22) Filed: Aug. 12, 2004

(65) Prior Publication Data
US 2006/0032356 A1  Feb. 16, 2006

(51) Int. Cl.
*B27B 5/06* (2006.01)
(52) U.S. Cl. .................................. 83/485; 83/471.2
(58) Field of Classification Search .............. 83/485, 83/486, 471.2, 489, 513, 471.3, 483, 487, 83/488, 484, 486.1; 30/371–378
See application file for complete search history.

(56) References Cited

U.S. PATENT DOCUMENTS

| | | | |
|---|---|---|---|
| 3,008,498 A | 11/1961 | Olson | |
| 4,022,182 A * | 5/1977 | Lenkevich | ............... 125/13.01 |
| 4,054,070 A | 10/1977 | Steiling | |
| 4,150,597 A | 4/1979 | Striebig | |
| 4,183,272 A | 1/1980 | Striebig | |
| 4,187,755 A * | 2/1980 | Shirai | ........................ 83/487 |
| 4,202,231 A * | 5/1980 | Striebig | .................... 83/471.2 |
| 4,555,969 A | 12/1985 | Abt | |
| 4,802,399 A | 2/1989 | Olson | |
| 4,909,114 A | 3/1990 | Astle | |
| 5,253,400 A * | 10/1993 | Conachen | .................... 83/488 |
| 6,736,043 B1 | 11/1998 | Eijnde | |
| 6,058,819 A | 5/2000 | Binder et al. | |
| 6,748,995 B2 | 6/2004 | Gorich et al. | |

OTHER PUBLICATIONS

Safety Speed Cut Manufacturing Company Incorporated, product catalog, 20 pages, 2004, Anoka, MN 55304 USA.
Safety Speed Cut, New TWIN Vertical Saw-Router. Press Release, 2 pages, Aug. 19, 1998.

* cited by examiner

*Primary Examiner*—Stephen Choi

(57) ABSTRACT

A panel saw has a first cutting blade for cutting stock in a first axis and a second cutting blade for cutting the stock in a second axis. The first blade moveable from a cutting position to a position in which stock can be slid between the cutting blade and a supporting frame of the panel saw. The panel saw allows repeated cross cuts and rip cuts without changing the cutting location of the first cutting blade. A control system is configured to retract the first cutting blade from contact with the stock if the current draw exceeds a value. The control system may also retract a cutting blade when it senses the end of a panel being cut.

13 Claims, 18 Drawing Sheets

MULTI-AXIS PANEL SAW

BACKGROUND OF THE INVENTION

In many industries raw material is handled in panel or sheet form, hereinafter referred to as panelized material. In many of the woodworking and related trades the panelized material is often manufactured having dimensions of about four feet by eight feet and a thickness of about ¼" to about 1". The panelized material is then cut to exact dimensions using various cutting equipment. The panelized material is typically rip-cut along the long dimension of the panelized material and cross-cut along the shorter dimension of the panelized material to make smaller pieces of material.

There are a number of machining methods and machines used to achieve this action of ripping and cross cutting of panelized material. Generally, this cutting action is performed on one or more specialized machines. The panelized material is typically ripped on a table saw and cross-cut on a radial arm saw. The table saw and the radial arm saw are well suited for each of these respective operations due to the layout of their guide mechanism.

The table saw usually has a guide mechanism, referred to as a fence, oriented parallel to the cutting plane of the blade. Material is fed into the machine along the fence so as to establish a constant width of the cut material. The material is supported in the horizontal plane by the primary table surface of the saw. This piece of equipment is well suited for cuts along the long axis of the panelized material or sheet good. Cutting across the short axis of a panel on a table saw can be a dangerous activity because there is a tendency for material to get jammed between the blade and the fence. This could result in a kick-back of material towards the operator which is clearly a dangerous situation.

After the material is ripped to a particular width on the table saw it is typically then transported to the radial arm saw for cross-cutting. The material is held stationary against a guide fence which is oriented perpendicular to the plane of the blade and the saw motor and blade assembly is actuated to travel across the material in an axis perpendicular to the guide fence. Again the panel is supported in the horizontal plane by the table structure of the radial arm saw. This process is repeated as necessary to cut the raw material panel into finished pieces of a specific length and width dimension. The radial arm saw has an associated safety issue. Since the motor and blade assembly combination travels on a track suspended above the panel being cut and the operation is performed by pulling the motor and blade assembly towards the operator from the resting position, there is tendency to over-feed during a cut, thereby causing the motor and blade assembly to aggressively move towards the operator.

The issues with these types of machines relate to material handling and operator safety. Manually feeding material into these machines can require more than one operator due to the weight and size of the panelized material. Additionally, there is an associated handling step between each machine to orient the panel through the sawing process. Also, handling of a panel while oriented in the horizontal plane can require considerable space and effort.

Another type of machine used for cutting panelized material to size is known as a vertical panel saw. This machine overcomes some of the issues having to do with material handling in the horizontal plane and the safety issues of material kick-back associated with using a table saw or radial arm saw. A near-vertical frame and a horizontal guide shelf are used to support the panelized material. The frame is approximately five to twenty degrees off of the vertical axis, thereby allowing gravity to naturally hold the panelized material in place. The guide shelf allows panels to be translated left or right and simplifies the loading and unloading process as well as the cutting process. The panel saw has a single electric motor with a circular cutting blade for cutting the panelized material.

The electric motor, through its housing, is fixed to a platform that translates on a pair of guide rails. The motor is rotatable on the platform between two positions. In the first position the cutting blade is oriented parallel to the guide rails and allows the panelized material to be cross-cut. During this cutting action the panelized material is held stationary on the panel saw frame and the operator slides the platform with the rotating cutting blade across the width of the panelized material. When the cut is completed, the operator must return the platform to a position towards the top of the panel saw in order to prepare the saw for cutting of another piece of material. In the second position the cutting blade is oriented parallel to the guide shelf and allows the panelized material to be rip cut. During this cutting action the platform with the electric motor and rotating cutting blade is locked to the guide rails and the operator slides the panelized material into the cutting blade.

The panel saw overcomes many of the safety issues of the table saw and radial arm saw and improves the material handling process by allowing the material to be worked in the near vertical orientation. However, a significant problem exists when trying to use this type of machine in situations that require a number of identical finished panels to be made. This situation occurs frequently when building a plurality of the same project or when building a project with duplicate components, for example, the ends, the sides, or the tops and bottoms of a box.

In existing panel saws only one dimensional value can be "set-up" at a time so as to cut only one pre-selected dimension. To cut numerous panels to the same dimensions, the operator could load the first panel on to the guide shelf, rip the panelized material to the first dimension, rotate the motor on the platform 90 degrees, set the second dimension, and then cross-cut the material. The operator would have to repeat this step for each additional panel. Resetting the machine from one dimension to another and back again invites deviations in dimensional values from one finished panel to the next.

Alternatively, the operator would have to rip all the panels to the first dimension, rotate the motor on the platform 90 degrees, and then reload all the panels back onto the guide shelf for cross cutting. This double handling problem adversely affects productivity.

Another variation of a panel saw is of a design often referred to as a "European style panel saw". A vertical panel frame again is the central structure of the machine. A translating mechanism that spans the narrow axis of the machine is connected to an additional mechanism that allows the entire saw/motor mechanism to translate along the long (horizontal) axis of the machine. This essentially allows the motor and blade assembly to operate over two dimensions rather than one, translation in the horizontal and vertical axis. However, the motor and blade assembly still must be rotated to make the typical two cuts required to size a panel to a particular length and width. Also, the coupled translational mechanism used in this style machine greatly increases the machine's cost and complexity.

In these panel saws the means for setting a desired length and width of a panel could not be set simultaneously while allowing the machine to be used for cutting. Only one dimensional value could be selected at a time. This is because only a single cutter head was used to perform both dimensional cuts. Cutting in one axis precluded the other axis dimension from be locked into a preset.

In existing panel saw systems, the blade depth is fixed to its maximum depth and panels can only be fully cut starting at one edge.

Existing dust collection systems on panel saws require a vacuum line to emanate from the highest point in the z-axis of the motor and blade assembly. These systems tangentially collect dust off of the periphery of the blade. The dust collection port would then transition at least 90 degrees to a vacuum hose that would lead towards the top of the machine. This arrangement is generally in the path of the operator and can make operating the machine a bit awkward.

One of the dangers of operating a circular saw, or any cutting machine, is associated with continued operation after the cutting head or saw blade has become dull. Many power tools have significant warnings regarding operation with the use of dull cutting tools. Operation with dull tooling can lead to damage of the machinery and injury to the operator. The motor and drive components can be damaged from the overload conditions presented by continued operation with dull tooling. The operator can be harmed by the excessive forces required to push material through a machine with dull tooling. Additionally, attempting to force material through the cutting process when the cutting tool has become dull can result in the jamming and/or the kickback of the material being machined. All of these conditions increase the risk of injury to the operator.

SUMMARY OF THE INVENTION

According to one aspect of the invention, there is provided an apparatus for cutting panelized material in two axes wherein both axes can concurrently be preset to pre-selected dimensional values and cutting can occur in either axis without changing the dimensional values.

In another aspect of the invention, there is provided an apparatus for cutting panelized material in two axes wherein material can be cut from an interior portion of the panelized material.

According to another aspect of the invention, there is provided an apparatus for cutting panelized material in two axes, the panel saw including an apparatus for retracting the saw blade away from panel frame.

According to another aspect of the invention, there is provided an apparatus for cutting panelized material including a system which detects if the machine is being or is about to be overloaded, and prevents, and may indicate the occurrence of an overload.

According to another aspect of the invention, there is a system which detects a motor operating parameter of a cutting apparatus and retracts the cutting blade after a series of transitions in the operating parameter.

According to another aspect of the invention, there is provided an apparatus for cutting panelized material including an improved dust collection port.

According to a further aspect of the invention, there is provided a method of preventing an overload of the cutting motor by detecting and acting on a motor operating parameter.

BRIEF DESCRIPTION OF DRAWINGS

Other objects and features of the invention will become apparent after considering several illustrative embodiments, taken in conjunction with accompanying drawings, in which.

DETAILED DESCRIPTION OF THE INVENTION

Figure 1:
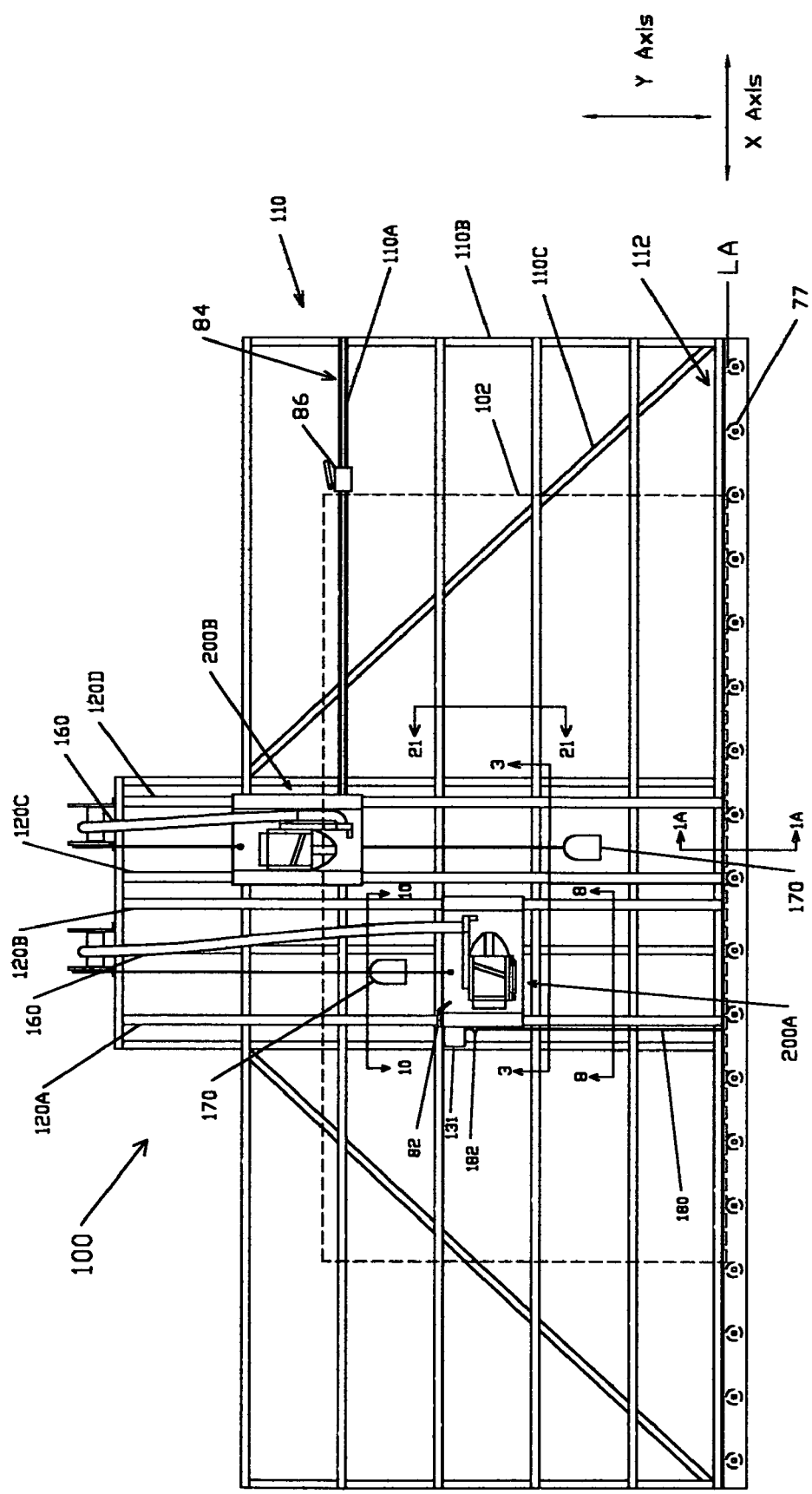
FIG. 1 is a front view of a first panel saw assembly consistent with the invention.
Figure 1A:
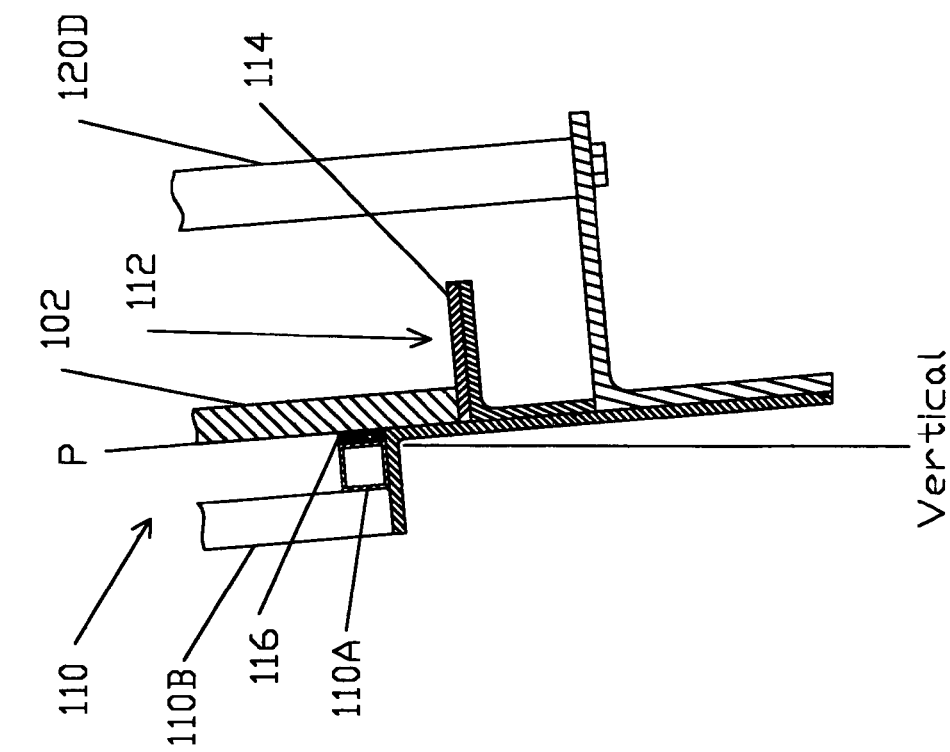
FIG. 1A is a partial section view taken of the panel saw assembly of FIG. 1 through line 1A-1A in FIG. 1.

FIGS. 1 and 1A disclose a front view and a partial section view respectively of a first panel saw assembly 100 consistent with the invention. The panel saw may be used to cut panelized material 102. Panelized material 102 may have a length, a width, and a thickness, with the thickness typically being substantially less than either the length or width. Known panelized material includes, but is not limited to, plywood, medium density fiber board, particle board, lauan, and wafer board in thickness from ¼" to 1," and even thicker. The panelized material 102 is typical manufactured in four foot by eight foot sheets, but other sizes, both larger and smaller, including sub-sheets may be cut. The panel saw assembly 100 is useful for machining panelized material 102 into smaller generally rectangular pieces.

The panel saw assembly 100 may have a frame 110 with a guide shelf 112 having a longitudinal axis LA extending along a lower edge of the frame 110. The lower edge of the panelized material is aligned in the "X" axis and a side edge of the panelized material is aligned in the "Y" axis. The frame 110 may have a plurality of horizontal members 110A, vertical members 110B, and angled members 110C, with a front surface of the frame 110 defining a plane P for supporting a back surface of the panelized material 102. The horizontal members 110A may include a replaceable surface material 116 on the front surface which may engage panelized material 102. Additionally the surface material 116 may allow a cutting tool to penetrate the plane P without damaging members 110A. The frame 110 may be of a welded steel tube construction. However, alternate materials and construction methods of suitable strength may be used without departing from the invention. Additionally, the plane P can be formed from a solid surface with grooves appropriately placed to allow clear passage of the saw blades or cutting tools. The frame 110 may be oriented at an angle to the vertical for example 5 to 20 degrees. A contact surface 114 of the guide shelf 112 may be oriented generally perpendicular to the plane P defined by the frame 110. The contact surface 114 may be defined by a plurality of rollers 77, as shown in FIG. 1 and in partial section view in FIG. 1A.

Figure 2B:
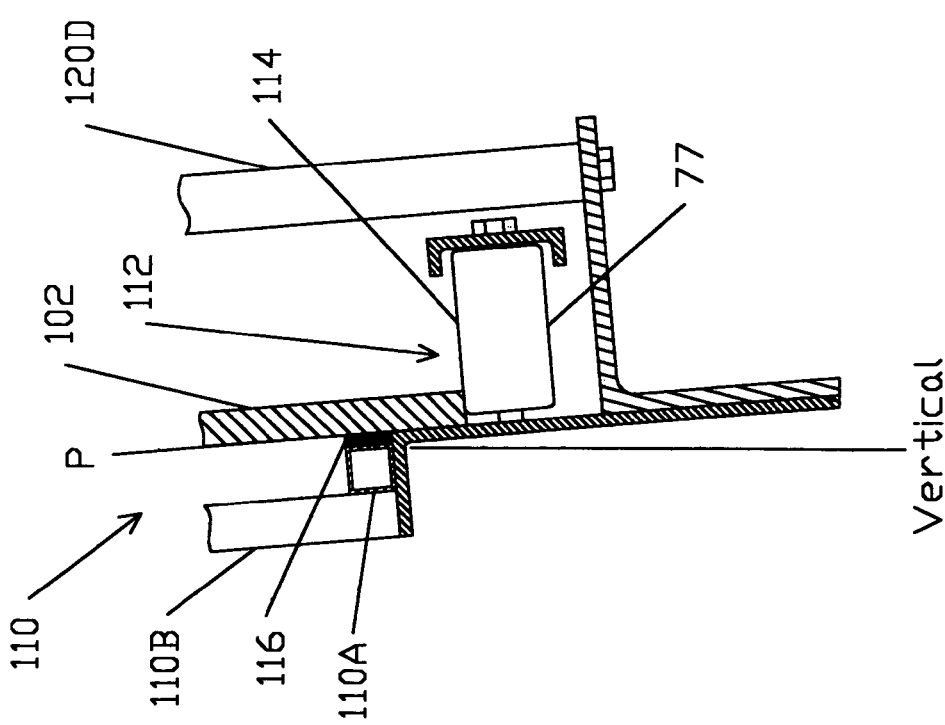
FIG. 2B is a partial section view of the panel saw assembly of FIG. 2 taken through line 2B-2B of FIG. 2.
Figure 2:
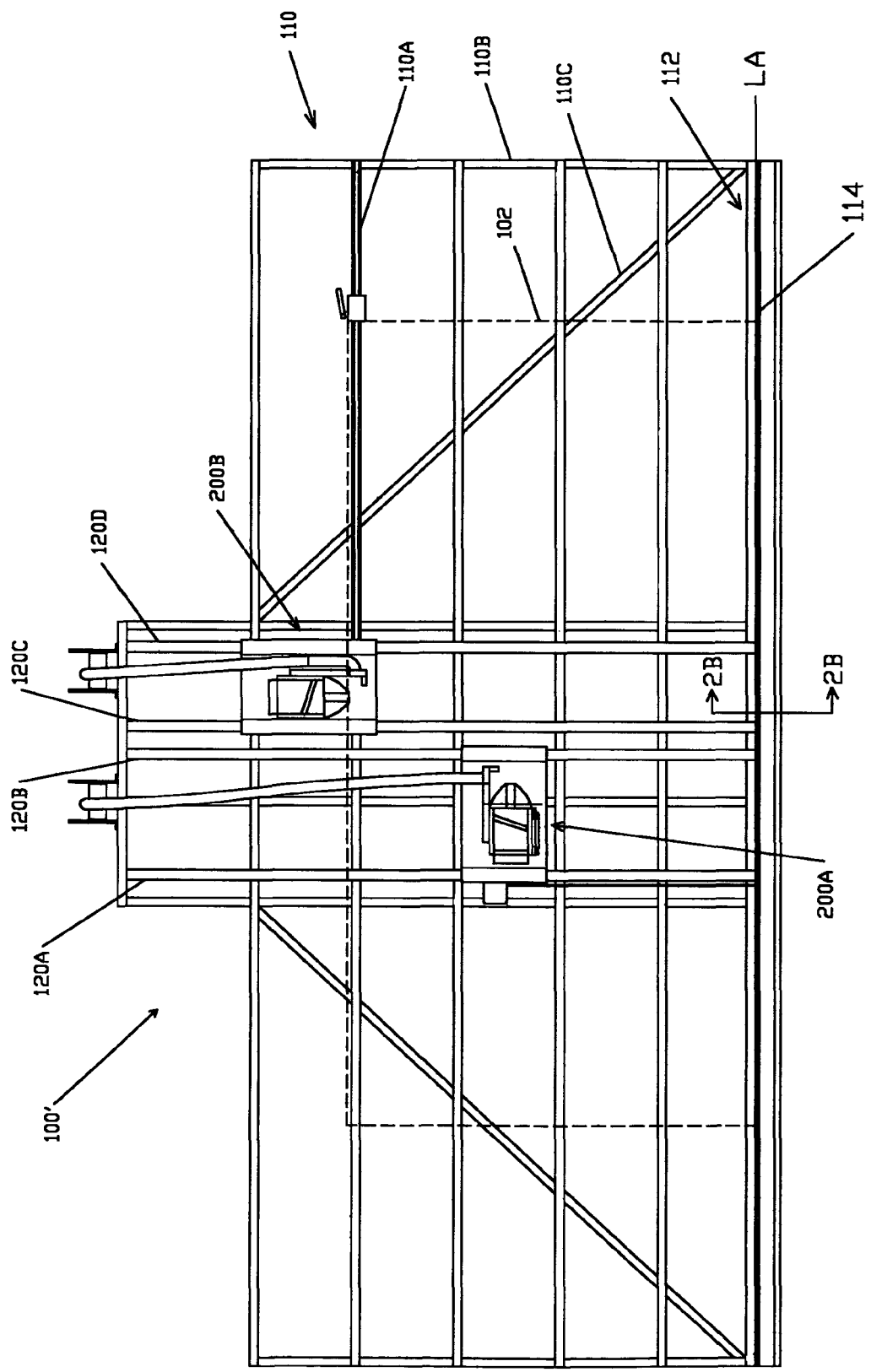
FIG. 2 is a front view of a second panel saw assembly consistent with the invention.

FIGS. 2 and 2B disclose a front view and a partial section view respectively of a second panel saw assembly 100' consistent with the invention. This panel saw assembly 100' is similar to that of panel saw assembly 100 of FIG. 1 except for the guide shelf 112. The guide shelf 112 of panel saw assembly 100', as shown in FIG. 2, likewise has a contact surface 114. However, as shown in FIGS. 2 and 2B, the contact surface 114 additionally forms a continuous surface along its longitudinal axis. The contact surface additionally may be coated with a low friction material such as polyethylene (UHMW) or Teflon®.

Figure 3:
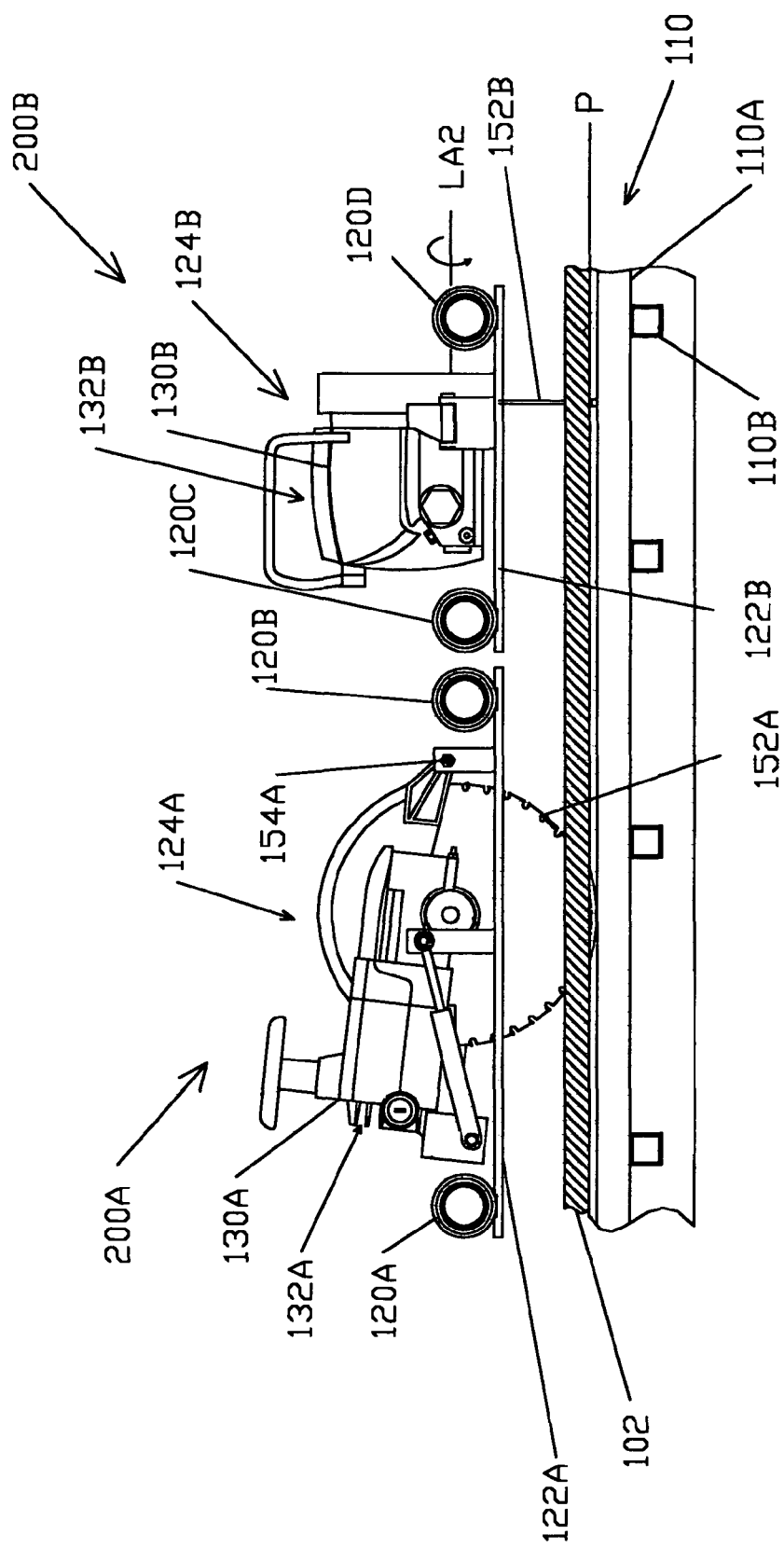
FIG. 3 is a partial section view of the panel saw assembly of FIG. 1 taken through line 3-3 in FIG. 1.

The panel saw assembly 100, 100' may have two or more guide rails for supporting two or more linearly translatable platforms. There may be a first guide rail 120A, a second guide rail 120B, a third guide rail 120C, and a fourth guide rail 120D. The guide rails are shown as having a circular cross section, but other shapes are considered part of the invention. Each guide rail 120A, 120B, 120C, 120D may be aligned generally parallel to the plane P defined by the frame 110 and perpendicular to the longitudinal axis LA of the guide shelf 112. As shown in FIG. 3, each linearly translatable platform 122A, 122B may be configured to support a machining tool. A first platform 122A may be coupled between the first guide rail 120A and the second guide rail 120B and a second platform 122B may be coupled between the third guide rail 120C and a fourth guide rail 120D. The first platform 122A may be configured to support a first machining tool 124A and the second platform 122B may be configured to support a second machining tool 124B. The first platform 122A and first machining tool 124A may be referred hereafter as a first saw carriage assembly 200A and the second platform 122B and second machining tool 124B may be referred hereafter as a second saw carriage assembly 200B.

The machining tool 124A, 124B may have a motor at least partially disposed in a housing. The machining tool 124A, 124B may have an output shaft 150A, 150B respectively adapted to axially support an associated cutting blade 152A, 152B. A longitudinal axis LA1, LA2 of the output shafts 150A, 150B may rotate in an axis of rotation parallel to the plane P defined by the front surface of the frame 110. The longitudinal axis LA1 of the output shaft 150A of the first machining tool 124A may also be aligned perpendicular to the longitudinal axis LA of the guide shelf 112 and the longitudinal axis LA2 of the output shaft 150B of the second machining tool 124B may also be aligned parallel to the longitudinal axis LA of the guide shelf 112.

The first platform 122A and the second platform 122B may be coupled to a retractor or counterbalance 170. The retractor or counterbalance 170 may urge the second saw carriage assembly 200B to return to a position near the top of the panel saw after the operator finishes a cross-cut. This position for the second saw carriage assembly 200B may be referred to hereafter as the "home" position. The home position of the second saw carriage assembly 200B is a location where the cutting blade 152B is sufficiently out of the way of the panelized material 102 so as to allow free loading and unloading of panelized material into the panel saw. Other retraction mechanisms could be used to perform this function of returning the saw carriage assembly to the home position. One example would be that of a spring loaded tool balancer or a retractor. The retractor or counterbalance 170 coupled to the first saw carriage assembly 200A provides a force to counteract the weight of the first saw carriage assembly thereby easing the translation of the first platform 122A along its guide rails 120A, 120B.

A first vacuum hose 160 may extend from the first saw carriage assembly 200A and a second vacuum hose 160 may extend from the second saw carriage assembly 200B to a vacuum (not shown).

A measuring system 180, for example a flexible tape, may have a retractable end coupled to the guide shelf 112 and a housing 131 coupled to the first platform 122A. A pointer 182 on the first platform 122A may be calibrated to indicate the actual rip width achieved by the first cutting blade 152A coupled to the first saw carriage assembly 200A. Alternatively, a ruler can be embedded in the guide rail 120A or in the guide rail 120B to provide dimensional information for the rip cut width. Another measuring system includes a digital based display systems that may be used to indicate the rip width dimension.

Figure 8:
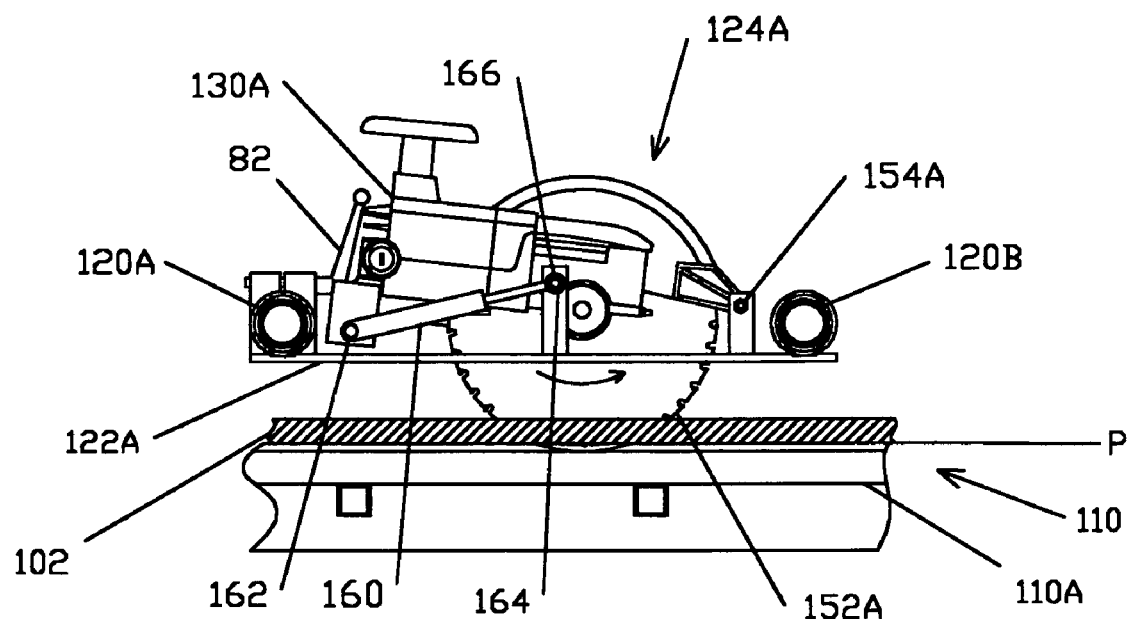
FIG. 8 is a section view taken through line 8-8 in FIG. 1 of a saw carriage assembly in an "extended" position.

Now referring to FIG. 8, a locking mechanism 82 coupled to the first platform 122A may allow the desired rip-cut dimension to be held in place for the duration of the required set-up. The locking mechanism 82 may be any suitable mechanism that firmly holds the first platform 122A with respect to at least one guide rail 120A, 120B. In one embodiment, the locking mechanism is a cam-action clamp. This allows for quick locking and unlocking of the rip width dimension.

The first saw carriage assembly 200A may be configured to cut the panelized material 102 parallel to the longitudinal axis LA of the guide shelf 112 and the second saw carriage assembly 200B may be configured to cut the panelized material 102 perpendicular to the longitudinal axis LA of the guide shelf 112. To cut the panelized material parallel to the longitudinal axis LA of the guide shelf 112, the first platform 122A is prevented from translating along the first rail 120A and second guide rail 120B by securing locking mechanism 82 and the panelized material 102 is urged towards the rotating cutting blade 152A.

A stop member 86 may be clampable to a horizontal member 110A of the frame 110. The horizontal member 110A may include a measurement scale 84. The stop member 86 can be located along the horizontal member 110A and the dimensional value between the stop member 86 and the path of the cutting blade 152B is indicated.

The set-up process for cutting panelized material may proceed in the following manner. A cross-cut length for the panelized material may be set by locking stop member 86 along a horizontal member 110A at an indicated dimensional value. The rip-cut width for the panelized material may be set by locating saw carriage assembly 200A at an appropriate position along guide rails 120A, 120B as indicated on the pointer 182, and the saw carriage assembly 200A may be locked into position by tightening the locking mechanism 82. The saw carriage assemblies are now set-up for two dimensional cutting of panelized material. The actual cutting of material may proceed as follows:

A panelized material, for example a four foot by eight foot sheet of plywood may be loaded into the panel saw, for example from left to right. A lower edge of the panelized material 102 may rest on the guide shelf 112 and the back surface of the sheet may rest against the plane P defined by the front surface of the frame 110. The operator may slide the panelized material 102 towards the right until the panelized material engages stop member 86. When the panelized material 102 reaches the stop member 86 the second cutting blade 152B of the second machining tool 124B is aligned at the desired cutting location. The operator starts the motor on the second saw carriage assembly 200B and pulls the second saw carriage assembly 200B downward over the sheet, cutting it as it goes. When the cut is complete, the operator returns the second saw carriage assembly 200B to the "home" position and removes the remaining sheet on the left side of the second saw carriage assembly 200B.

The operator may then start the motor on the first saw carriage assembly 200A, which may already be locked in place, and moves the first cutting blade 152A from the retracted position to the extended position, to be discussed below. The operator may then push the remaining sheet on the right side of the panel saw towards the rotating first cutting blade 152A. When the cut is complete, the operator may remove the upper and lower sheets and return the first cutting blade 152A to the retracted position. The lower portion of the panelized material has been cut to a selected length and width dimension. The panel saw is now ready to cut additional, similarly sized panelized material without having to set or reset the linear position of the first saw carriage assembly 200A. The panelized material may be cross-cut or ripped in either order without departing from the invention The first pair of guide rails, made up of first guide rail 120A and second guide rail 120B and the second pair of guide rails, made up of third guide rail 120C and fourth guide rail 120D are preferably mounted just off the vertical center line of the frame 110. The first pair disposed to the left of the vertical centerline and the second pair disposed to the right of the vertical centerline. The location of the guide rails may be altered without departing from the invention. The location of the first saw carriage assembly 200A may be moved from guide rails 120A, 120B to 120C, 120D without departing from the invention. Any mounting location of the guide rails about the frame 110 is considered part of the invention.

As shown in FIG. 1A and FIG. 3, the panelized material is loaded into the panel saw between the plane P defined by the front surface of the frame 110 and the guide rails 120A, 120B, 120C, and 120D. The backside of the panelized material is supported on the front surface of the frame 110 and one edge of the panelized material is supported by the contact surface 114 of the guide shelf 112.

Figure 20:
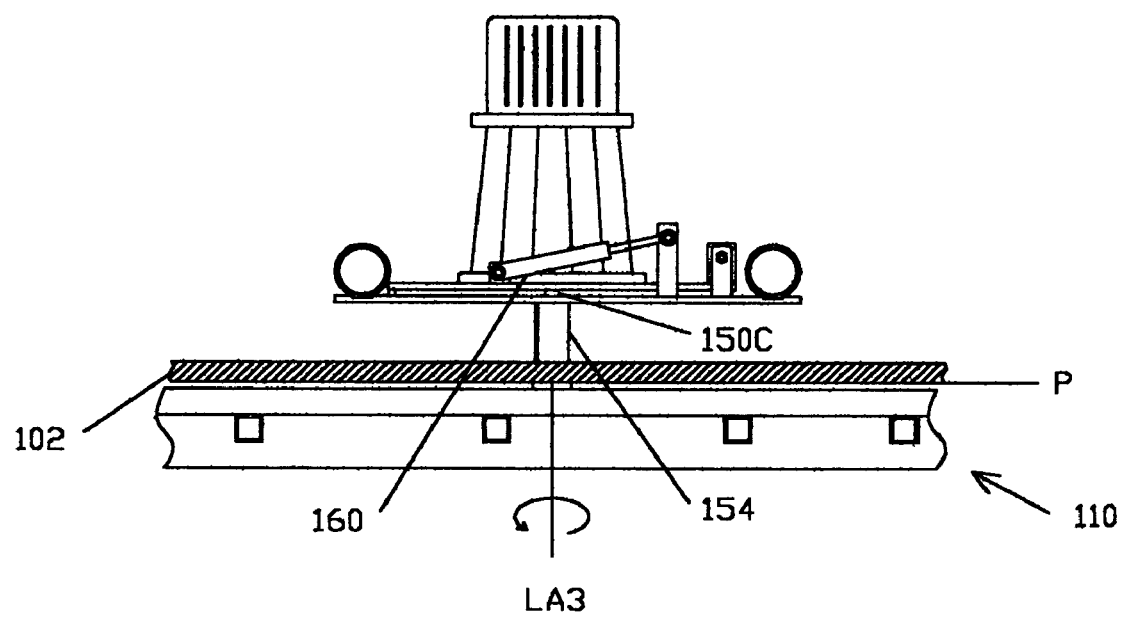
FIG. 20 is a partial section view of a fifth saw carriage assembly consistent with the invention.
Figure 21:
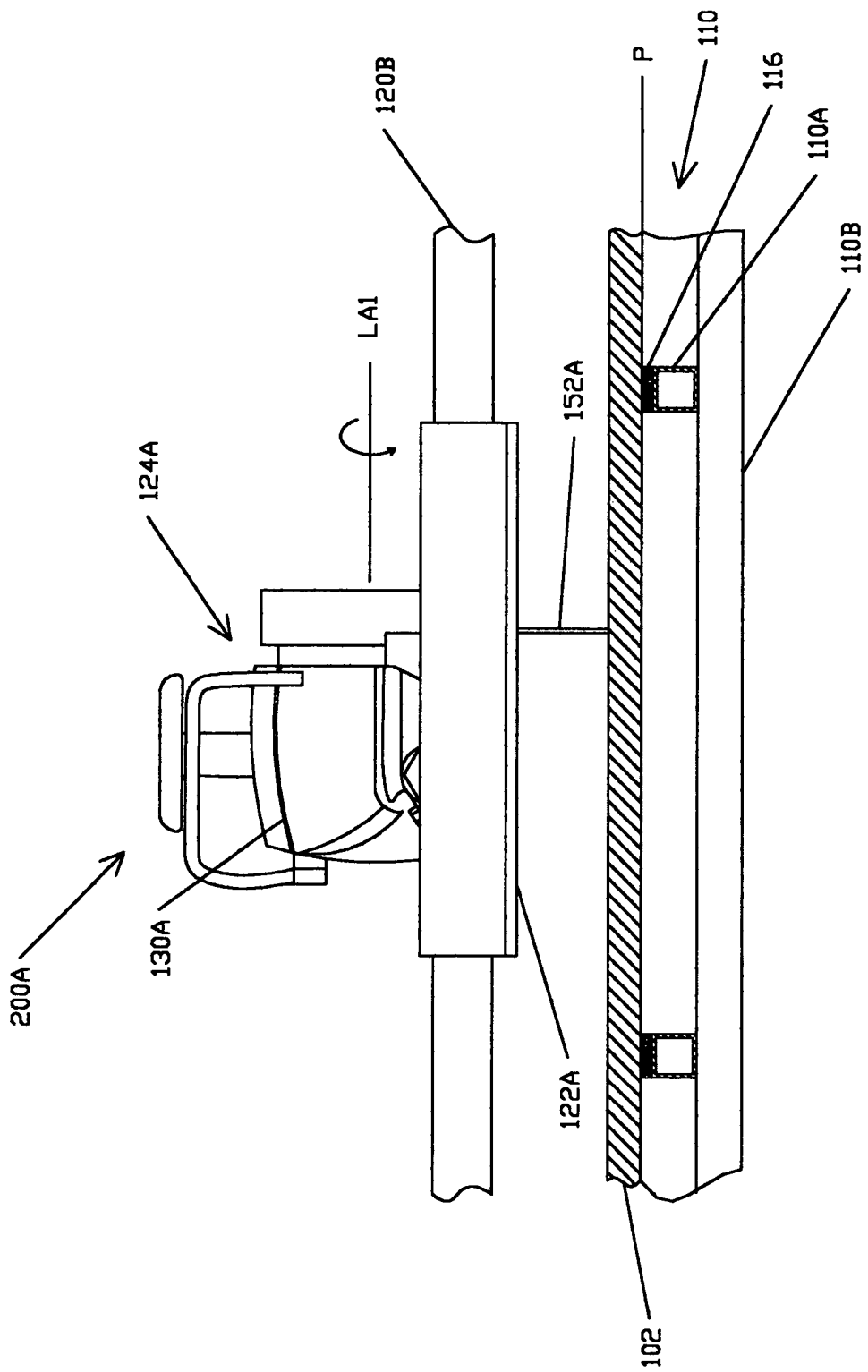
FIG. 21 is a partial section view taken of the panel saw assembly of FIG. 1 through line 21-21 in FIG. 1.

FIG. 3 is a partial section view of the panel saw assembly taken through line 3-3 in FIG. 1. The first machining tool 124A may have an electric motor 132A at least partially enclosed in the housing 130A and the second machining tool 124B may have an electric motor 132B at least partially enclosed in a housing 130B. The first machining tool 124A may have the output shaft 150A, (shown in FIG. 11), coupled to the first cutting blade 152A. The machining may be done with a circular saw blade, which has a plurality of generally radially oriented teeth spaced about a center of rotation, or a router blade 154 (shown in FIG. 20), which has one or more cutting surface along the periphery of a rotating output shaft 150C. The output shaft 150A may be adapted to axially support the first cutting blade 152A. When the circular saw blade 152A is used, a longitudinal axis LA1 (shown in FIG. 21) of the output shaft 150A may be aligned parallel to the plane P defined by the front surface of the frame 110. When the router blade 154 is used, a longitudinal axis LA3 of the output shaft 150C (shown in FIG. 20) may be aligned perpendicular to the plane P defined by the front surface of the frame 110.

The first platform 122A and the second platform 122B may be coupled to the guide rails 120A, 120B, 120C, 120D with a dedicated set of sleeve bearings that translate along the guide rails 120A, 120B, 120C, 120D. The sleeve bearings may be self-cleaning which may be an advantage in an environment which is prone to dust and debris. Each pass of the platform up and down the guide rails provides a wiping action by the sleeve bearing, thus keeping the guide rail free of dust and debris and allowing the platforms to move smoothly. Alternately, the platform may be coupled to the guide rails with linear row bearings or roller bearings.

Figure 4:
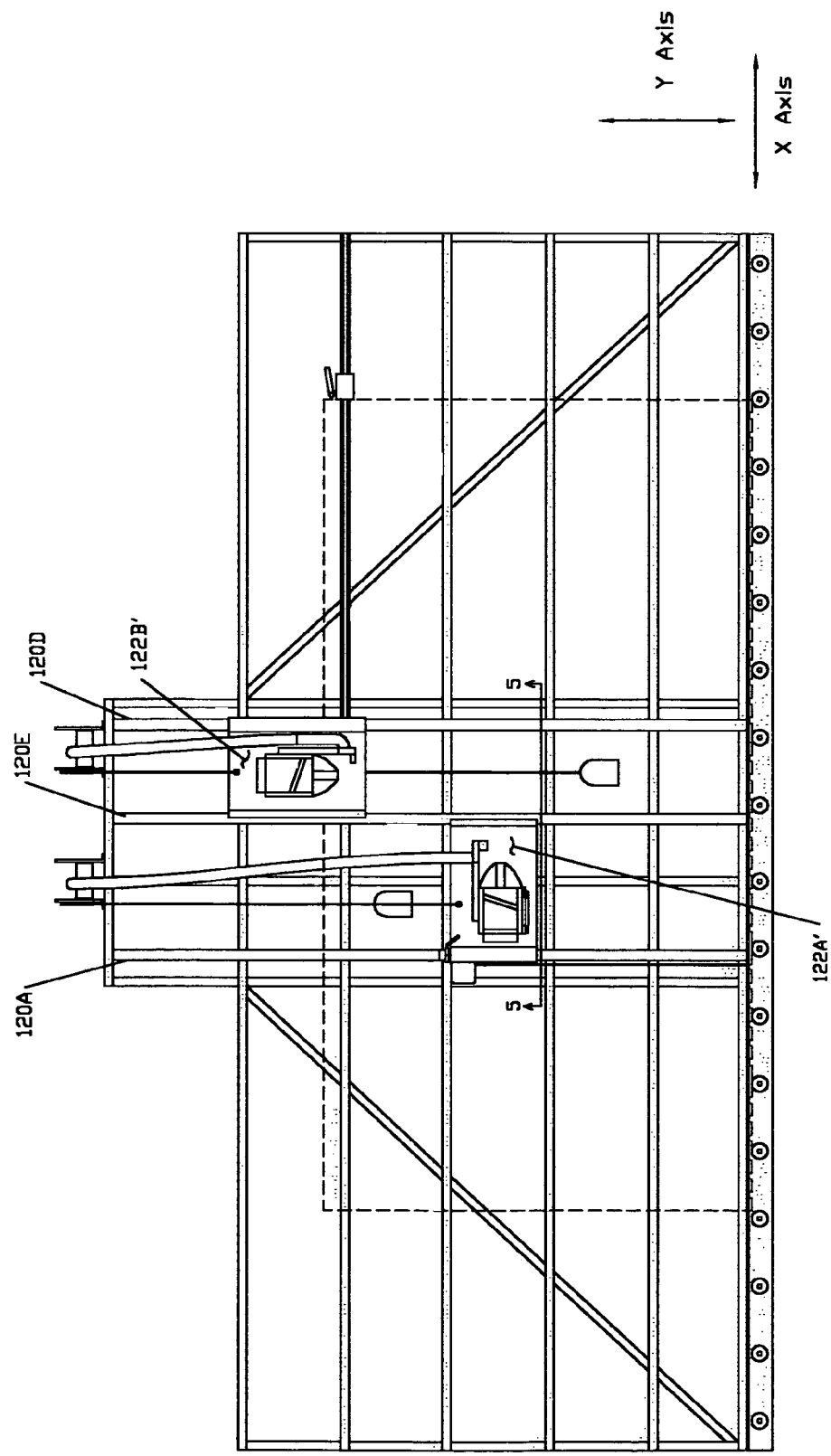
FIG. 4 is a front view of a third panel saw assembly consistent with the invention.
Figure 5:
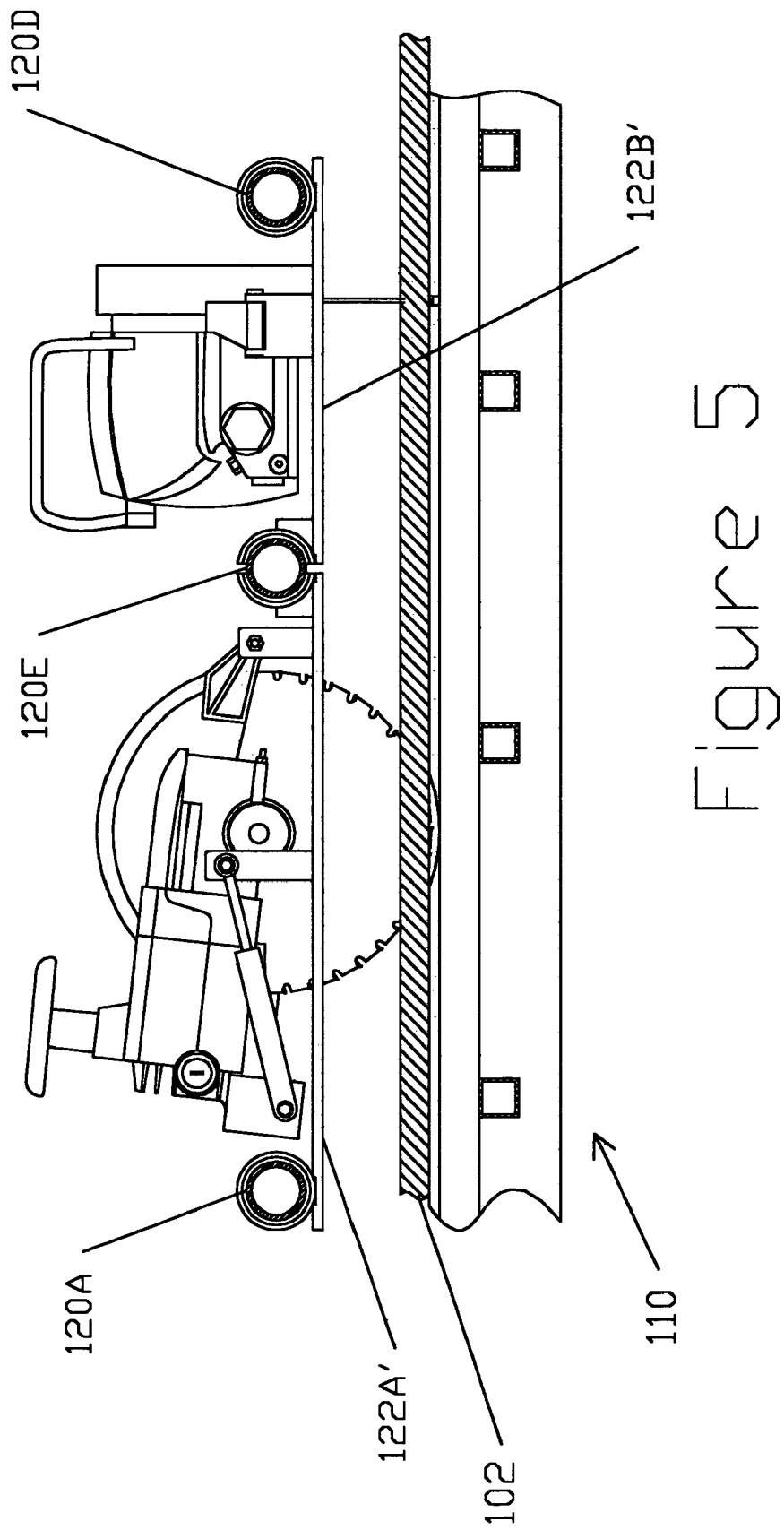
FIG. 5 is a partial section view of the third panel saw assembly of FIG. 4 taken through line 5-5 of FIG. 4.

FIG. 4 is a front view and FIG. 5 is a partial section view taken through line 5-5 of FIG. 4 of a third panel saw consistent with the invention in which a single center guide rail 120E supports both a first platform 122A' and a second platform 122B'. The bearing used may couple to the center guide rail 120E over only a portion of the cross section of the center single guide rail 120E.

Figure 6:
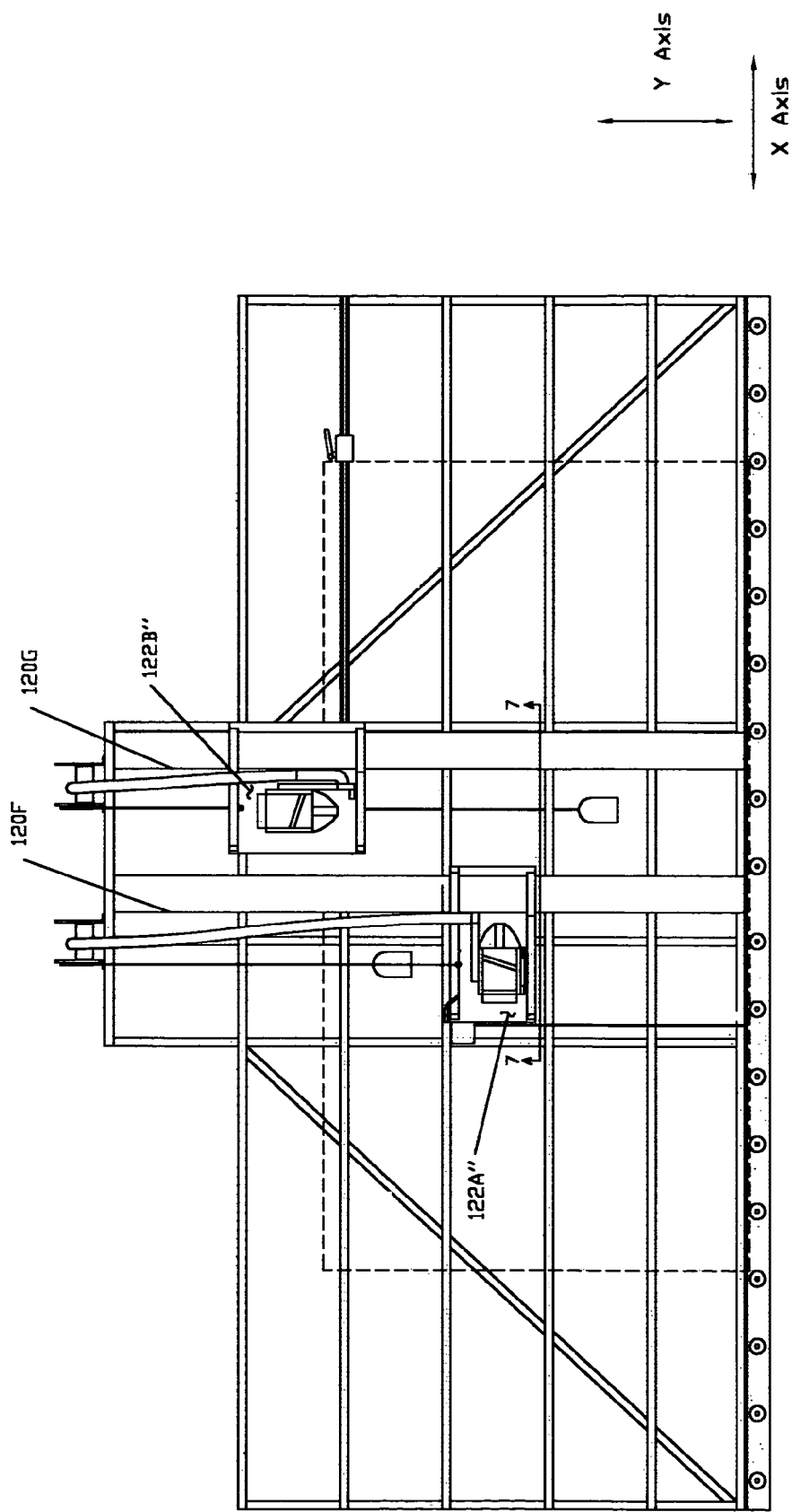
FIG. 6 is a front view of a fourth panel saw assembly consistent with the invention.
Figure 7:
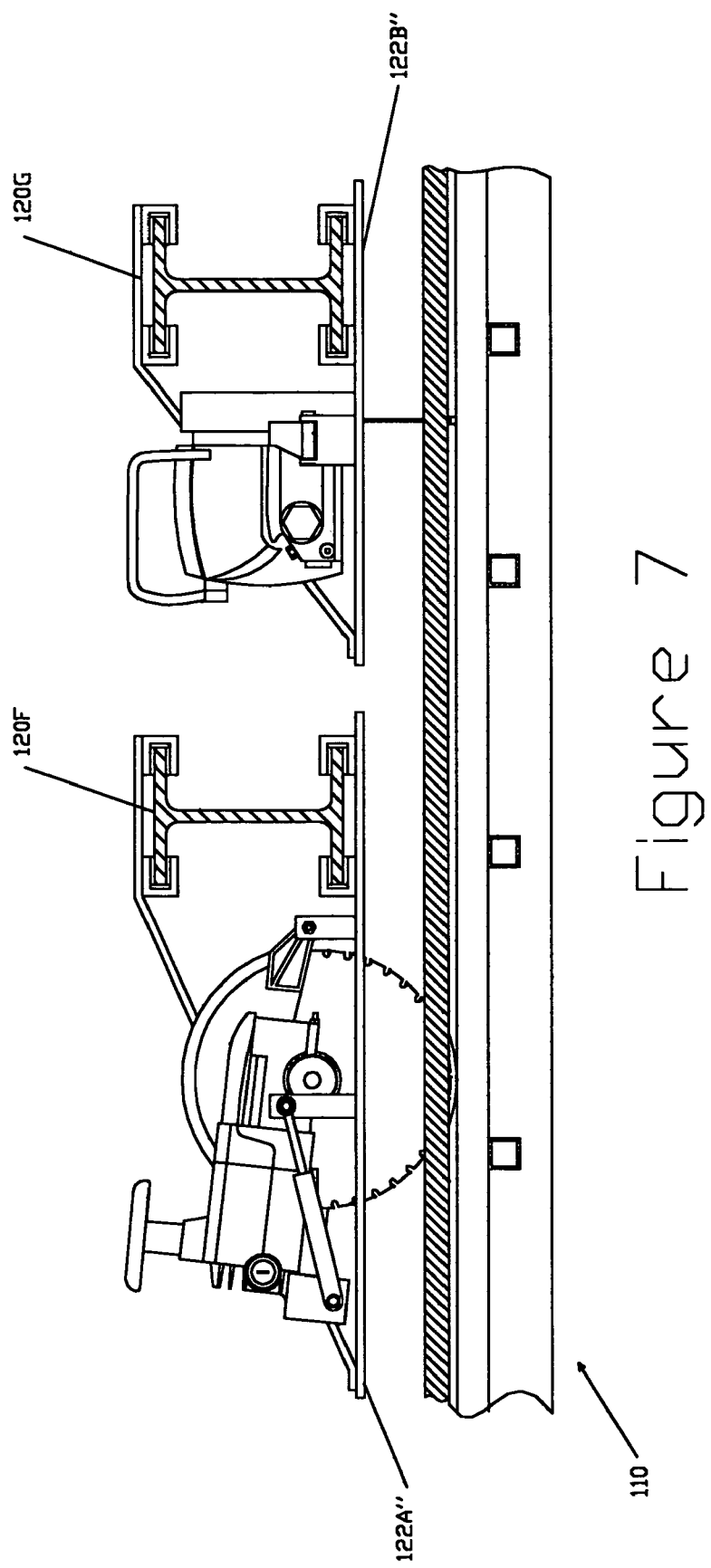
FIG. 7 is a partial section view of the fourth panel saw assembly of FIG. 6. taken through line 7-7 of FIG. 6.

FIG. 6 is a front view and FIG. 7 is a partial section view taken through line 7-7 of FIG. 6 of a fourth panel saw consistent with the invention in which a single first guide rail 120F supports a first platform 122A" and a single second guide rail 120G supports a second platform 122B".

Figure 9:
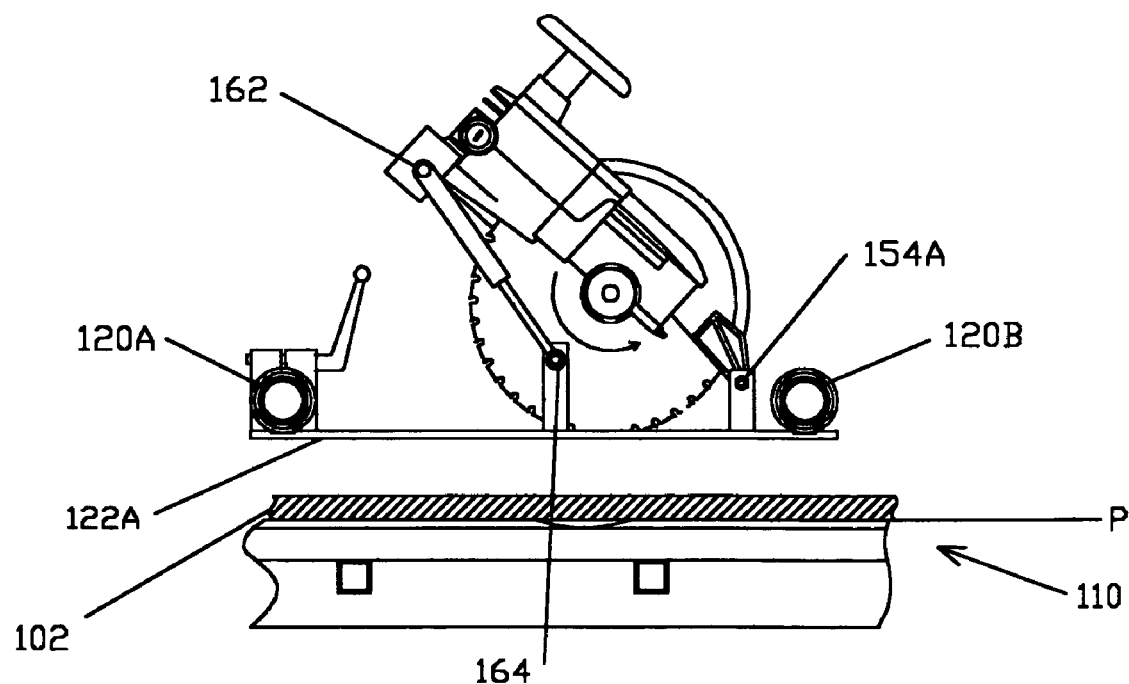
FIG. 9 is a section view taken through line 8-8 in FIG. 1 of the saw carriage assembly in a "retracted" position.
Figure 10:
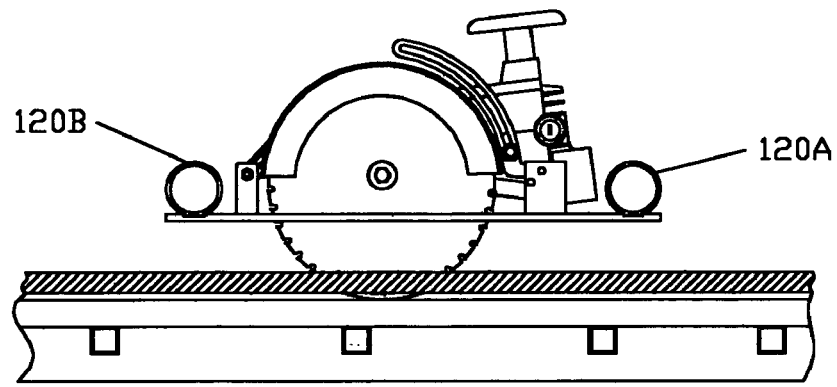
FIG. 10 is a section view taken through line 10-10 in FIG. 1 of the saw carriage assembly in an "extended" position.
Figure 11:
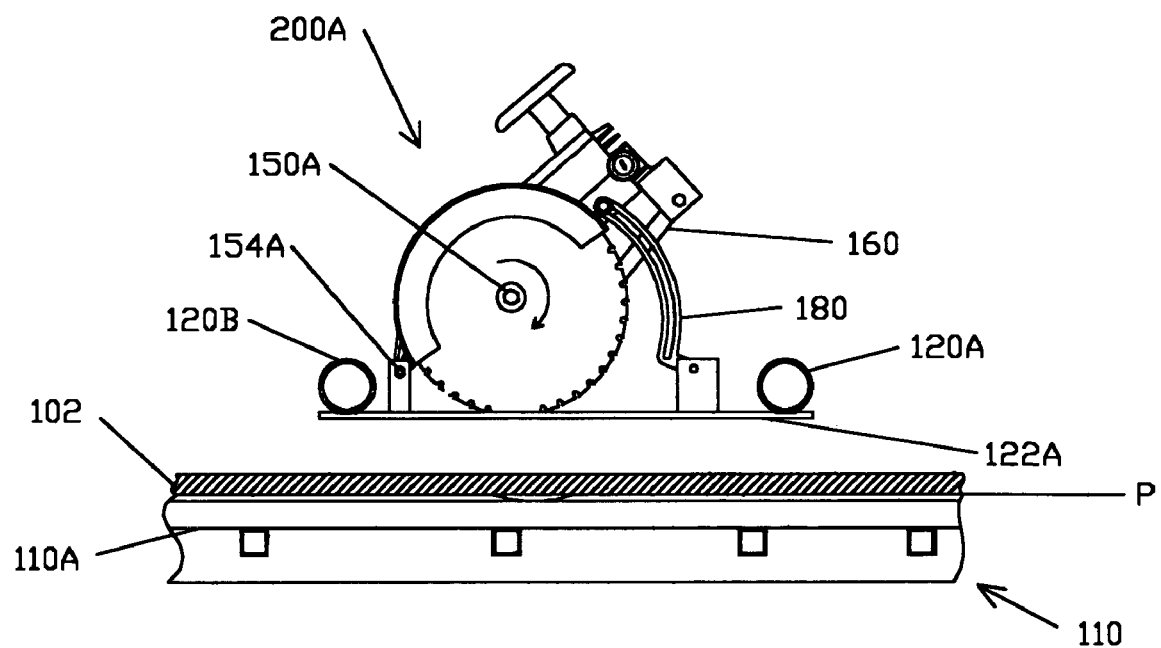
FIG. 11 is a section view taken through line 10-10 in FIG. 1 of the saw carriage assembly in a "retracted" position.

FIG. 8 is a section view taken through line 8-8 in FIG. 1 of the saw carriage assembly 200A in an "extended" position; FIG. 9 is a section view taken through line 8-8 in FIG. 1 of the saw carriage assembly 200A in a "retracted" position; FIG. 10 is a section view taken through line 10-10 in FIG. 1 of the saw carriage assembly 200A in an "extended" position; and FIG. 11 is a section view taken through line 10-10 in FIG. 1 of the saw carriage assembly 200A in a "retracted" position.

The first housing 130A may be hingeably coupled to the first platform 122A about a point of rotation 154A, that may be spaced from the first platform 122A, as shown. The first hingeable housing 130A provides an axis of rotation that allows the output shaft 150A to move between the extended position, as shown in FIGS. 8 and 10, and the retracted position, as shown in FIGS. 9 and 11. In the extended position, the cutting blade 152A may extend equal with or below the plane P defined by the front surface of the frame 110 and in the retracted position the cutting blade 152A may be spaced from a front side of the panelized material 102.

The first housing 130A may also be coupled to the first platform 122A through a biasing mechanism 160. The biasing mechanism 160 may have a first end 162 and a second end 164, with the first end 162 pivotably coupled to the first housing 130A and the second end 164 pivotably coupled to a connection point 166. The biasing mechanism 160 may be coupled between the first housing 130A and the first platform 122A to secure the axis of rotation of the cutting blade 152A in the extended and retracted positions. Travel of the first housing may be limited by a limiting mechanism 180. The limiting mechanism 180 may limit the rotational position of the first machining tool 124A and likewise the maximum retraction depth and maximum extended depth.

Although the housing 130A is shown to rotate between the extended and the retracted position with respect to the plane, it may linearly move from the retracted position to the extended position without departing from the invention.

The biasing mechanism 160 may include, but is not limited to, a gas spring, a compression spring, and a controllable actuator. A controllable actuator may be used to set the depth of cut of the cutting blade 152A whereas the gas spring and the compression spring may provide a bi-stable mechanism to secure the axis of rotation of the cutting blade 152A in two stable positions, the extended and retracted positions. The bi-stable mechanism may hold the machining tool relative to the platform without the need for a clamping mechanism, such as a thumb screw or a cam-action clamp. A controllable actuator having the ability to hold the first machine tool at a range of positions between fully extended and fully retracted may be considered a positioning means.

The biasing mechanism 160 may act at a pivotal connection between the first platform 122A and the housing 130A. The connection point 166 may be chosen to be above pivot point 154A on the platform 122A. When the first machining tool 124A is in the extended position, the first end 162 of the biasing mechanism 160 may be below the point of rotation 154A and in the retracted position, the first end 162 of the biasing member 160 may be above the point of rotation 154A. This helps ensure the biasing mechanism 160 holds the first machining tool 124A in the two extreme positions.

By allowing the cutting blade of the first machining tool 124A to move from the retracted to the extended positions, the operator may start a cut other than at the edge of the panelized material, i.e., spaced from an edge. This may be referred to as plunge cutting and may be done with either a circular saw blade or a router blade.

The second housing 130B may, but does not have to, be rotatable about the second platform 122B between the retracted and the extended position.

Figure 12:
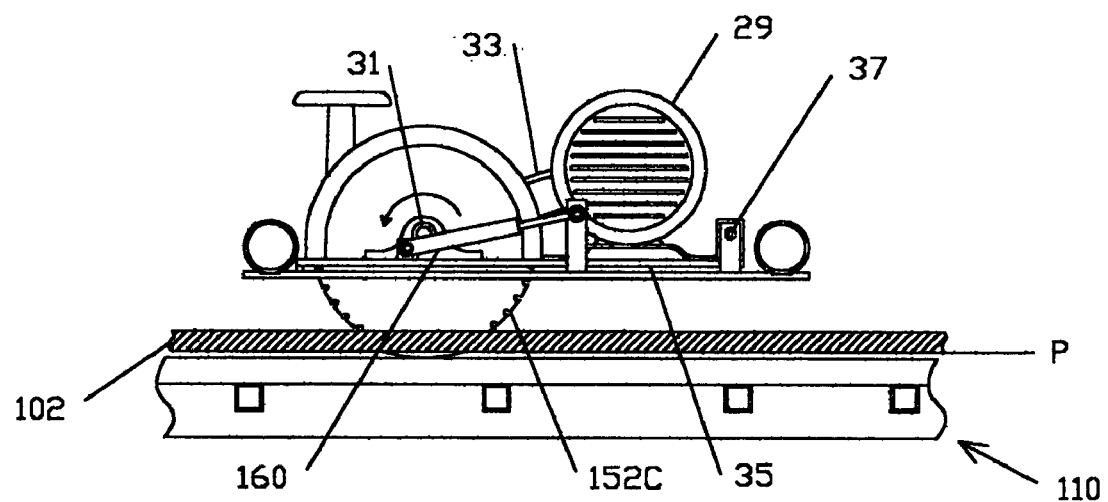
FIG. 12 is a partial section view of a second saw carriage assembly consistent with the invention.

The motor of the panel saw may be implemented with a standard heavy-duty circular saw in a single integral unit. FIG. 12 is a side view of an second saw carriage assembly consistent with the invention in which a severe duty motor 29 is coupled to a saw arbor 31 by a belt 33 or chain. The motor may be a continuous duty rated induction motor in a totally enclosed frame. With a severe duty motor 29, the motor and a saw arbor, which forms an output shaft for supporting a circular saw blade 152C, may be mounted to a support arm 35. The support arm 35 may be hingeably coupled to a platform. The support arm may be moveable between a retracted position, not shown, to an extended position, shown in FIG. 12. Alternately, the severe duty motor may be mounted directly to the platform, and a saw arbor having an output shaft mounted on a hingeable support arm. The hingeable support arm rotates at pivotable connection 37, allowing the saw arbor to move with respect to the platform, enabling the saw arbor to move between a retracted position and an extended position. In this configuration, with a non-integral severe duty saw motor, the support arm is considered to be a type of housing for the output shaft. The saw arbor may be coupled to the platform with a biasing mechanism 160 or positioning means as described above.

Figure 13:
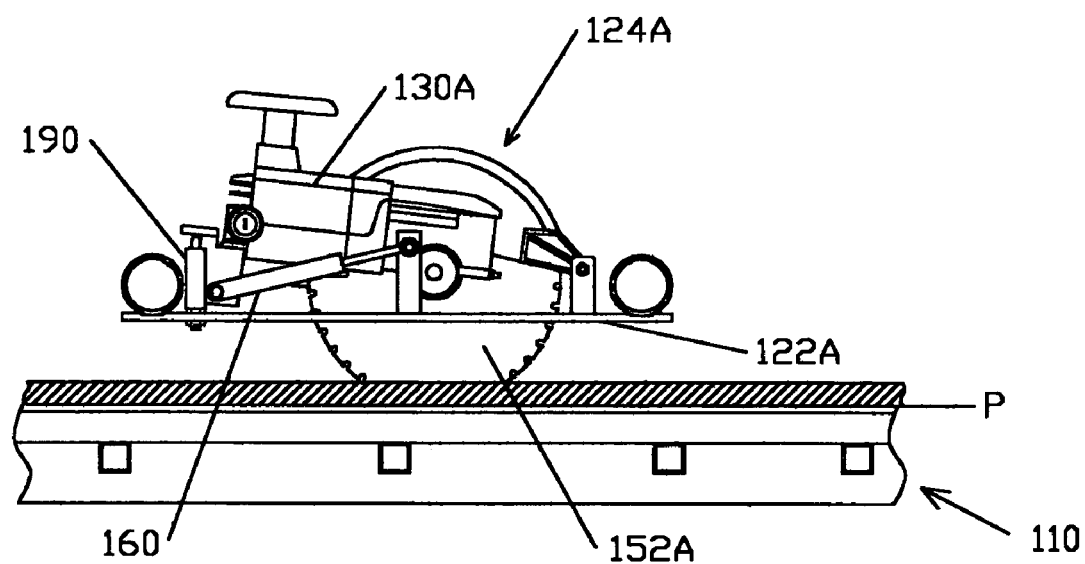
FIG. 13 is a partial section view of a third saw carriage assembly consistent with the invention.

FIG. 13 is a side view of a third saw carriage assembly consistent with the invention. When the biasing mechanism 160 utilizes a gas or compression spring, as opposed to a controllable actuator, a single action controllable actuator or controllable retractor 190 may be added to urge the housing 130A and the cutting blade 152A to rotate from the extended to the retracted position. This controllable actuator may be referred to as a retractor or a retract actuator. The retractor 190 may be coupled to at least one of the platform 122A and the housing 130A for moving the first machining tool 124A away from the plane P defined by the front surface of the frame 110. An operator of the panel saw may set the cutting blade 152A in the extended position to begin the cutting process of the panelized material. The biasing mechanism 160 may hold the cutting blade 152A in the extended position during the cutting action and at the end of the cutting process, the retractor 190 may be actuated by a control system (to be discussed below) to cause the housing 130A and the cutting blade 152A to move from the extended position to the retracted position to allow for the loading of a new panel. The retractor 190 may be any one of many commercially available controllable actuators such as a pneumatic, electric or hydraulic actuator. Without the retractor 190, the retraction may be performed by the operator.

Figure 14:
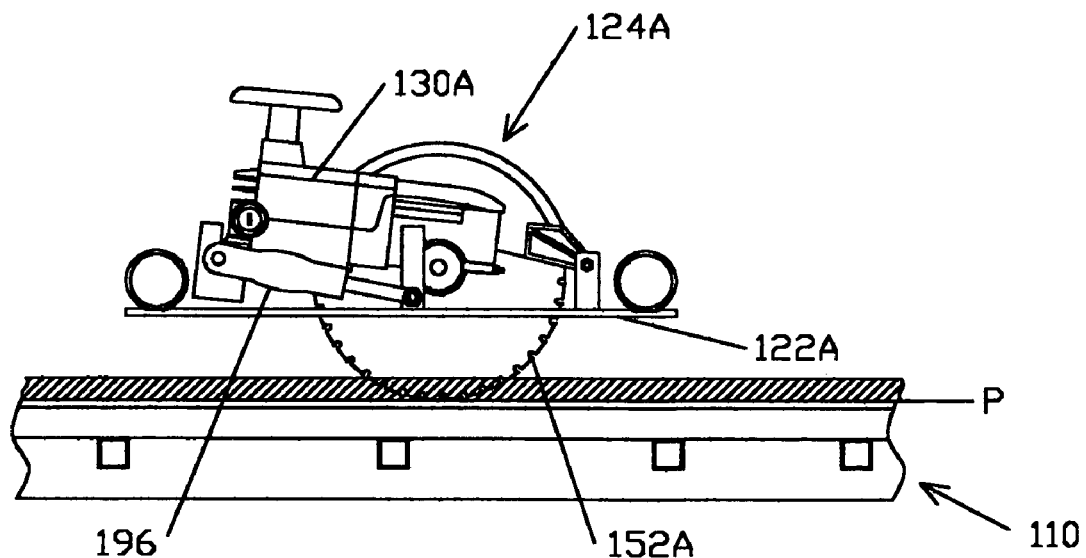
FIG. 14 is a partial section view of a fourth saw carriage assembly consistent with the invention.

As shown in FIG. 14, a controllable actuator 196 may be coupled between the platform 122A and the housing 130A for rotating the first machining tool 124A with respect to the plane P defined by the front surface of the frame 110. A control system coupled to the controllable actuator may be activated by the operator or in combination with sensors for detecting the presence and/or position of panelized material in the panel saw. The controllable actuator 196 may move the cutting blade from the extended to the retracted position or simply set the depth of cut.

Alternately, the retractor 190 or the controllable actuator 196 may be implemented with a rotary actuator such as a stepper motor or a gear-head motor with the addition of a linkage arm. The linkage arm would convert the rotary motion of these types of actuators into linear motion for coupling to the housing 130A. This motion thereby providing the extended and retracted position of the housing 130A with respect to the plane P of the frame.

The retractor 190 and the controllable actuator 196 may be actuated by a control system that monitors a motor operating parameter. The control system can be implemented with analog or digital circuitry, or a combination of both, and the logic function could additionally be implemented with a microprocessor and appropriate software.

Figure 16:
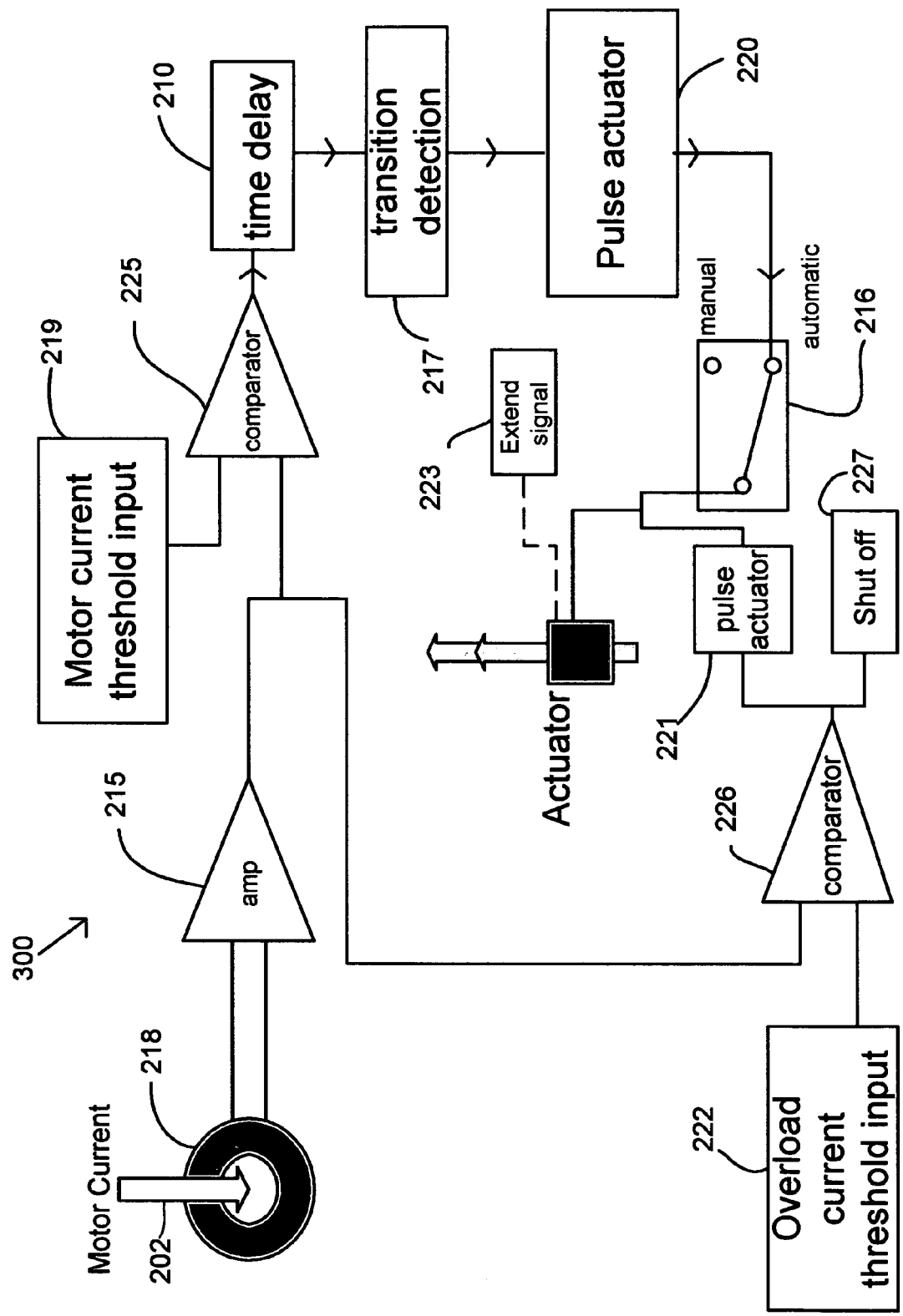
FIG. 16 is a block diagram of a control system consistent with the invention.
Figure 17:
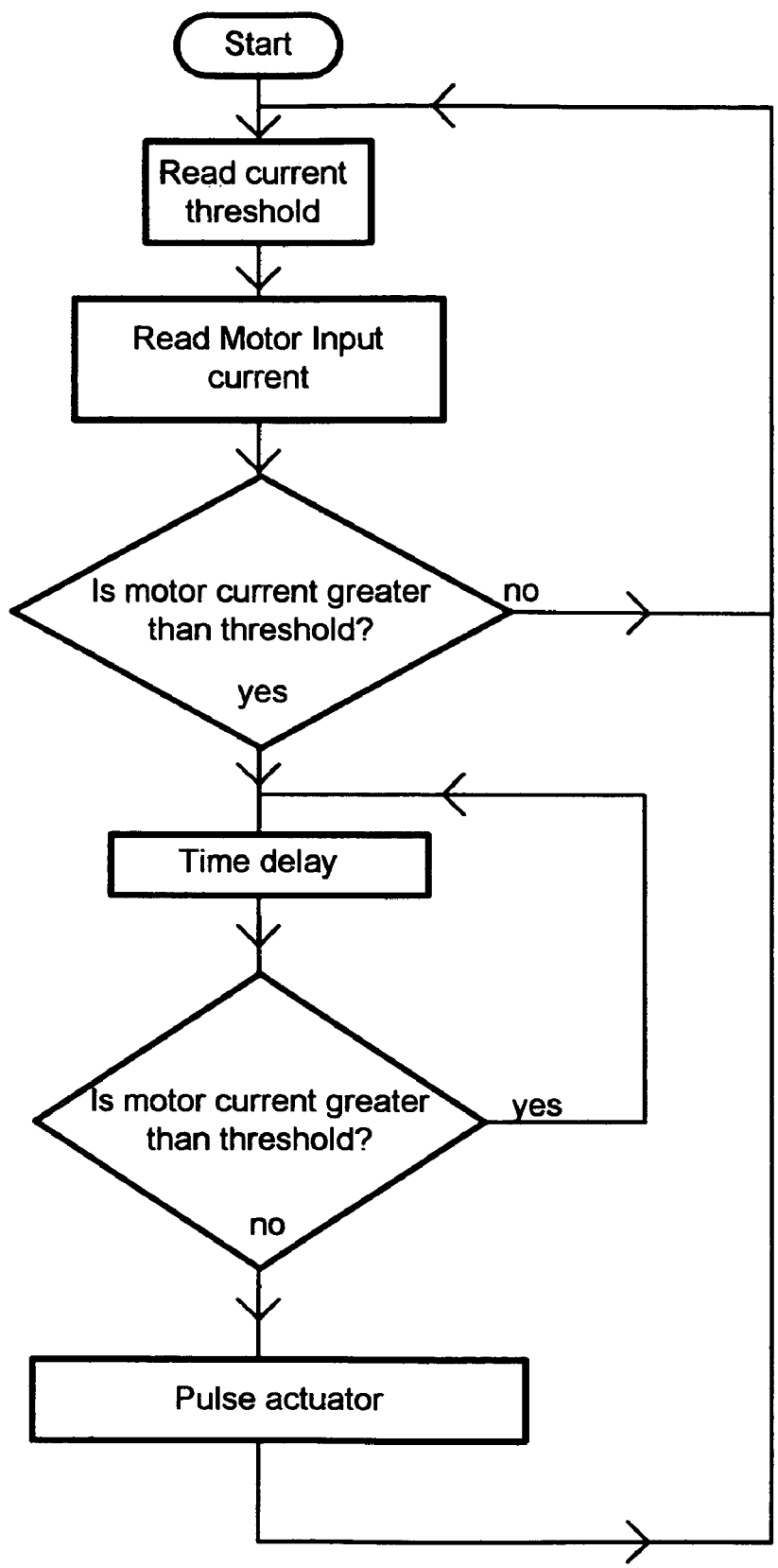
FIG. 17 is a flow chart consistent with the invention.

FIG. 16 is a block diagram of a control system 300 consistent with the invention and FIG. 17 is a flow chart consistent with the invention. The control system 300 may monitor a motor operating parameter 202, including, but not limited to motor current, torque, temperature, and speed. The control system 300 and method to be described below may be utilized separate from a panel saw, for example in any machining device, for example a table saw, a radial arm saw, a chop saw, a circular saw, and a router. The control system 300 and method may be used to retract a cutting blade when the machining tool reaches the end of the material being cut or when the control circuit determines that too high of a load is being placed on the motor, for example by a blade that has stalled or is about to stall, a blade that is too dull, or the material is being fed at too high of a feed rate.

The control system 300 may monitor a motor operating parameter 202 while a panel is fed into a rotating blade coupled to a machining tool. In the embodiment shown in FIGS. 16 and 17, the control system 300 is monitoring the motor current. When the value of the motor current exceeds a threshold value, the control system 300 may cause the retractor 190 or controllable actuator 196 to move the cutting blade with respect to the frame 110. The cutting blade may move from the extended position to the retracted position.

FIG. 16 is a block diagram of the control system 300 consistent with the invention which may be used to control a retractor 190 or a controllable actuator 196. The operating parameter, motor current, is sensed by current sensor 218. The current sensor 218 produces a signal which is fed to an amplifier 215. The amplifier 215 boosts the signal from the current sensor and feeds a signal proportional to motor current to a comparator 225. The comparator 225 receives at its inputs the signal from the motor current sensor and a signal from the motor current threshold input 219. This motor current threshold input could be set by the manufacture or implemented as a user adjustable potentiometer or an increase/decrease set of switches to set a threshold level. The amplified version of the saw motor current may be compared against the threshold level by the comparator 225. When the saw motor current goes above the threshold level the output state of the comparator 225 changes. This change of state enables a time delay 210. As long as the motor current is above the threshold value the time delay 210 output remains high. When the motor current goes below the threshold level, the time delay 210 keeps its output high for the duration of its timer value, typically this will be about 2 seconds although other times may be used without departing from the invention. This time delay 210 acts to prevent false triggering of the retractor if there is just a temporary pause in the cutting process. When the time delay expires, its output goes low. This low transition of the time delay output is detected by the transition detector 217. When the transition detector 217 senses a change of state of the time delay output from a high level to a low level the pulse actuator 220 is activated. The pulse actuator 220 drives the retractor 190 or controllable actuator 196, through automatic/manual mode switch 216, which in turn acts on the associated machining tool, such as the first machining tool 124A, driving it to the retracted position. The pulse actuator 220 is suitably designed to drive the retractor used in a particular application. The automatic/manual mode switch 216 provides for a selection by the operator between two modes. In automatic mode the retractor 190 or controllable actuator 196 will return the machining tool 124A to the retracted position at the end of the cut cycle. In manual mode the retract actuator 190 or controllable actuator 196 will not be activated. In the manual mode the retraction of the machining tool must be initiated by the operator. This accommodates situations when the operator does not want the machining tool retracted at the end of a cutting cycle.

The control system 300 additionally may be used in conjunction with a controllable actuator 196 with the addition of one more functional block shown in FIG. 16. The control system 300 may be capable of driving the controllable actuator 196 to the retracted position, however with the additional functional block producing an extend signal 223 the controllable actuator 196 may be driven in a direction which would move the associated machining tool to the extended position. The actuation of the controllable actuator 196 may be accomplished with a momentary pushbutton switch that applies an appropriate signal to the actuator.

Control system 300 may include a second threshold as indicated by overload current threshold 222. This second threshold sets an upper bound for the maximum allowable current and therefore the maximum load on the machining tool motor. This level may be selected such that sustained operation at or above this level would normally cause damage to the motor, such as by overheating. The comparator 226 compares the overload current threshold against the amplified motor current signal from the amplifier 215. If the motor current exceeds the overload current threshold the comparator 226 will trigger a pulse actuator 221 and may trigger an optional function which may shut off the motor. This optional function block is the shut off block 227. Pulse actuator 221 may be coupled to the retract actuator 190 or controllable actuator 196. It is preferred, but not necessary, to have this separate pulse actuator 221 which is coupled directly to the retract actuator, thereby preventing this safety feature from being disabled.

The control system 300 for the retractor 190 or the controllable actuator 196 could therefore have at least two conditions that would cause the retraction of the cutting blade. First, when the motor current exceeds a first predetermined level, followed by a drop in motor current below the first predetermined level (at the end of a normal cut routine) and second, if the motor current exceeds a second predetermined level, greater than the first level (the motor is overloaded). Additionally, the control system 300 may be implemented with a threshold for detection of the end of a cut, or a threshold to detect the onset of an overload, or multiple thresholds to detect both of these conditions without departing from the invention.

The flow chart shown in FIG. 17 can be implemented in the form of software or firmware run on a microprocessor or a microcontroller or as a logic circuit built with a combination of analog and digital electronics. An implementation of the control system for the retract actuator using a microcontroller would receive inputs from a motor current sensor and a motor current threshold input device such as a potentiometer or switches and a preferable, but not necessary, automatic/manual selection switch. The microcontroller would provide an electrical signal to the retractor 190 or controllable actuator 196 to cause the cutting blade, associated with the machining tool moved by the actuator, to retract at an appropriate time.

Figure 22:
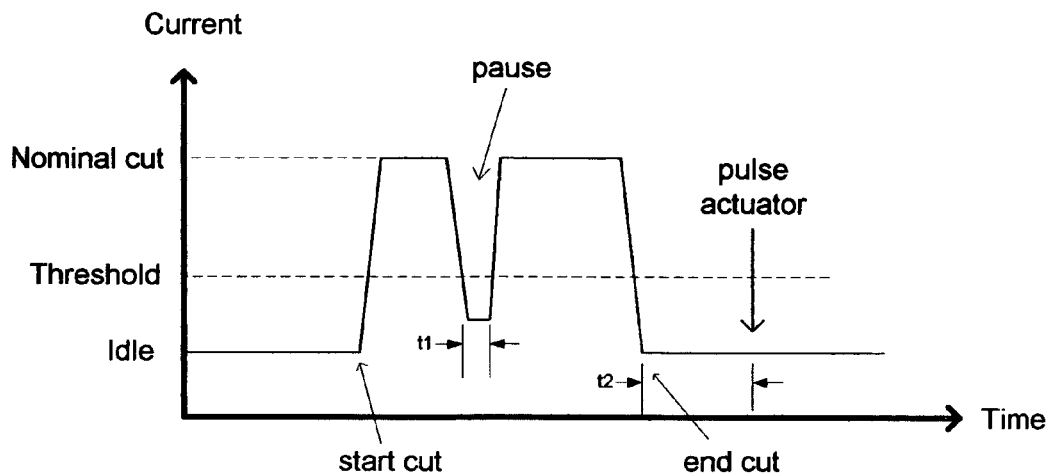
FIG. 22 is a plot of a motor operating parameter during normal operation consistent with the invention.
Figure 23:
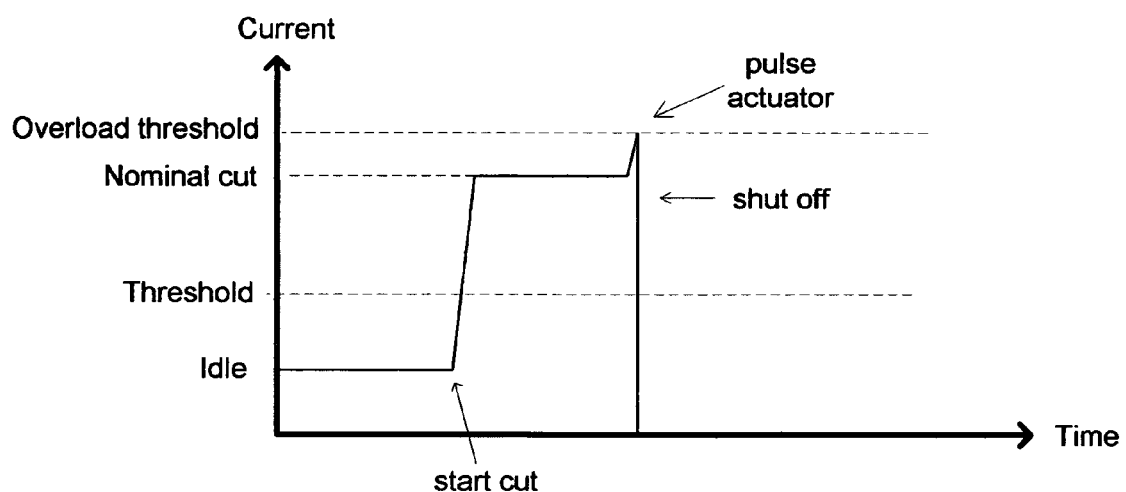
FIG. 23 is a plot of a motor operating parameter during an overload condition consistent with the invention.

Now referring to FIG. 22 and FIG. 23, example plots of the motor operating parameter, motor current, as a function of time that may be observed and responded to by the control system 300 in response to cutting on the saw of the invention are shown. Although the example as shown is directed to the monitoring of motor current, other motor operating parameters may monitored without departing from the invention. FIG. 22 shows the motor current drawn during periods of time when a motor of the panel saw, for example motor 132A is operating during idle time and during the time associated with cutting of panelized material. Additionally, FIG. 22 shows a period of time during which the cutting process is only momentarily interrupted, this time may occur if the operator pauses to readjust his grip on the panelized material while performing a cutting action. These conditions are shown from left to right as follows: At first the motor is started and is operating at a level shown as "idle" This level of current is the amount drawn when the motor is running but not cutting material. This level continues until the cutting process starts, as shown at the point noted as "start cut". The current required by the motor then rises to the level required to cut the material at a particular feed rate and is noted by the level "nominal cut". This level is above the threshold level, which corresponds to threshold level 219 of FIG. 16, and would be recognized as such by control system 300. As long as material is cut at this particular feed rate the motor current will stay at this elevated value. If the operator reduces the feed rate of material through the saw, the current drawn by the motor will be reduced. If the feed rate is sufficiently reduced, the motor current may drop below the threshold value. This is indicated in FIG. 22 by the notation "pause". However, if the duration of the reduced feed rate as indicated by "t1" is less than a pre-selected duration, shown as the time delay 210 in FIG. 16, then the control system 300 will not provide a signal to the retractor 190 or controllable actuator 196 to retract the saw blade. Cutting may continue as shown in FIG. 22, with the motor current again rising above the threshold value, the control system 300 will continue monitoring the motor current and will continue to disregard additional pauses which cause momentary reductions in motor current. However, when the motor current does fall below the threshold value for at least a time period equal to or greater than "t2", which is a time greater than "t1", the control system 300 will provide a signal that may cause the retractor 190 or controllable actuator 196 to cause the retraction of the cutting blade. This action would normally occur at the end of cut of a piece of panelized material.

FIG. 23 shows the addition of a second threshold level, such as the overload current threshold 222 of FIG. 16. The overload current threshold is a level above the threshold level 219 and is a value above which sustained operation may cause damage to the motor or other parts of the sawing apparatus. As shown in FIG. 23 the motor current starts at an idle current level and remains there until the start of material cutting as indicated by "start cut". The motor current then passes through the first threshold level as it rises to the nominal cut level. The motor current in this example levels off at a nominal cut value until another event such an overload condition occurs, as described previously this may be due to a number of factors such as over-feeding or dull tooling, during this overload condition the motor current rises above a second threshold level as indicated by "overload threshold" in FIG. 23. The control system 300 in response to this condition may cause the retractor 190 or controllable actuator 196 to retract the saw blade. Additionally, the control system may cause the motor to shut off via the shut off block 227 of FIG. 16. These threshold based control systems can be implemented in a system of the invention either independently or in a combined fashion.

An overload is considered to be any operating condition such as excessive current draw caused by a dull saw blade, improper feed rate, or material jammed between the saw blade and the structure of the panel saw whereby continued operation increases the risk to the operator or damage to the machine.

Figure 15:
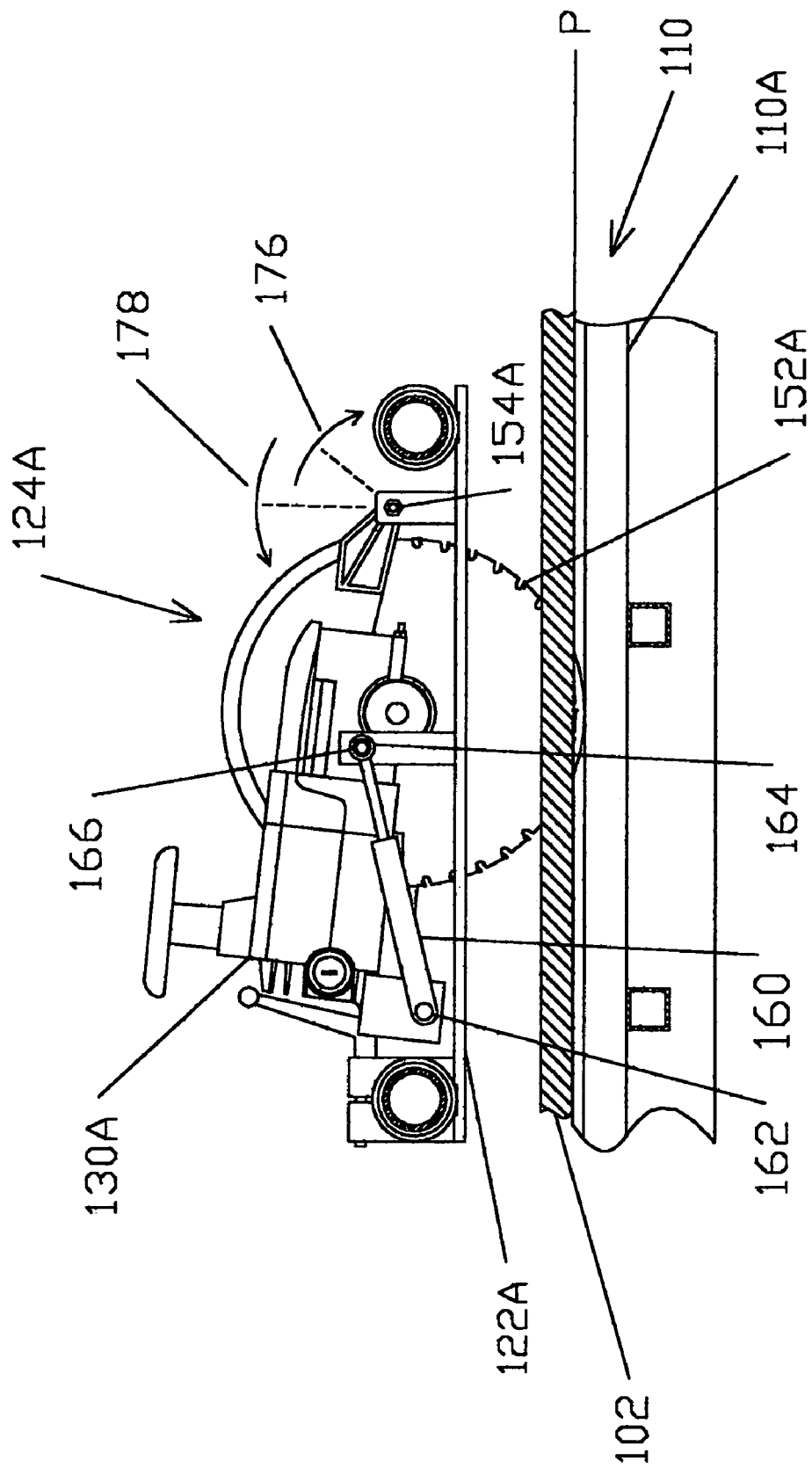
FIG. 15 is a torque diagram consistent with the invention.

Referring to FIG. 15 the biasing mechanism 160 may hold the machining tool and thereby the cutting blade in the retracted and the extended position. When in the extended position, the biasing mechanism 160 exerts a force on the motor housing 130A with respect to the first platform 122A. This force exerted on the motor housing 130A may be in a direction so as to apply a net torque on the motor housing 130A about the pivot point 154A in FIG. 15, this torque herein after will be referred to as the holding torque 178. When in the extended position, this holding torque 178 helps hold the motor housing 130A in the extended position. While the cutting blade is cutting the material, the cutting action applies a torque on the motor output shaft 150A via the saw blade 152A, herein after referred to as the cutting torque 176. The cutting torque 176 may be located such that it has a net value also about the pivot point 154A. However, the cutting torque is in the opposite direction with respect to the holding torque of the biasing mechanism. Additionally, the cutting torque may a have a predetermined maximum value above which an overload of the motor may occur. As the load on the motor increases from higher feed rates or from dull tooling the net cutting torque will increase. If the cutting torque 176 exceeds the holding torque 178, the motor may automatically be retracted. This action may automatically stop the cutting of material by retracting the saw blade, thus preventing an overload of the machine and possible injury to the operator and/or damage to machine. The retraction of the cutting blade during the cutting action may indicate to the operator that an unusual condition such as an overload has occurred. The overload condition may indicate that the saw is being feed at an excessive rate, the blade has become dull, or that material is getting jammed between the cutting blade and some part of the saw. This visual indication may alert the operator that the machine needs servicing or is being operated beyond its normal capability.

The vertical panel machining system of the invention can also be fitted with a router or routers on one or more of the saw carriages. Replacing the traditional circular saw of a saw carriage with a router can provide a new set of machining capabilities. For example, if a router is fitted with a straight flute router bit, grooves can be cut in a panel for mating with other panels. A router placed in each of the first and second saw carriage assemblies may allow two-axis routing of panels. Any suitable cutting or machining apparatus can be fitted to one or more of the saw carriage assemblies of the invention.

Additionally, the biasing mechanism 160 may allow for a plunge cut in a panel. Since a cutting blade can be retracted, a panel can be aligned so as to start the cutting action at some interior location of a panel rather than starting from the edge of a panel. If both saw carriage assemblies are equipped with the biasing mechanism then a plunge cut can easily be executed in both the x and y axis of a panel. With proper set up an interior portion of a panel can be sawn out of a sheet good with the accuracy and safety afforded by the panel saw structure.

Figure 18:
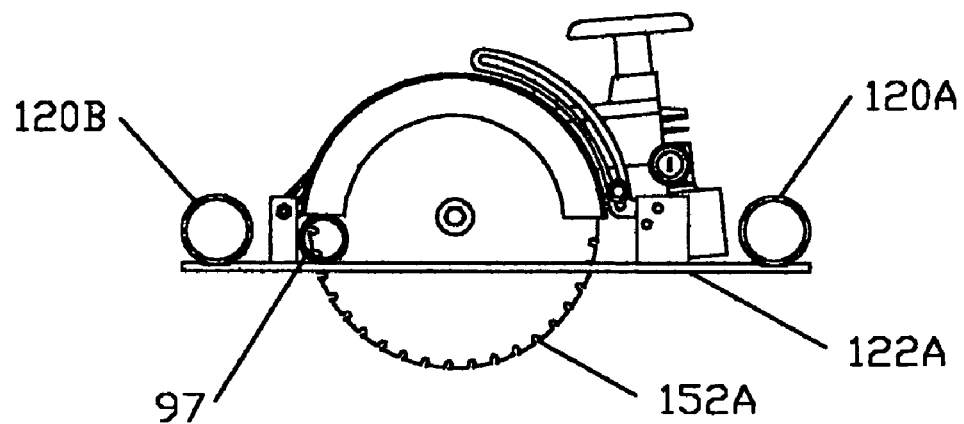
FIG. 18 is a side view of a sawdust collection system consistent with the invention.
Figure 19:
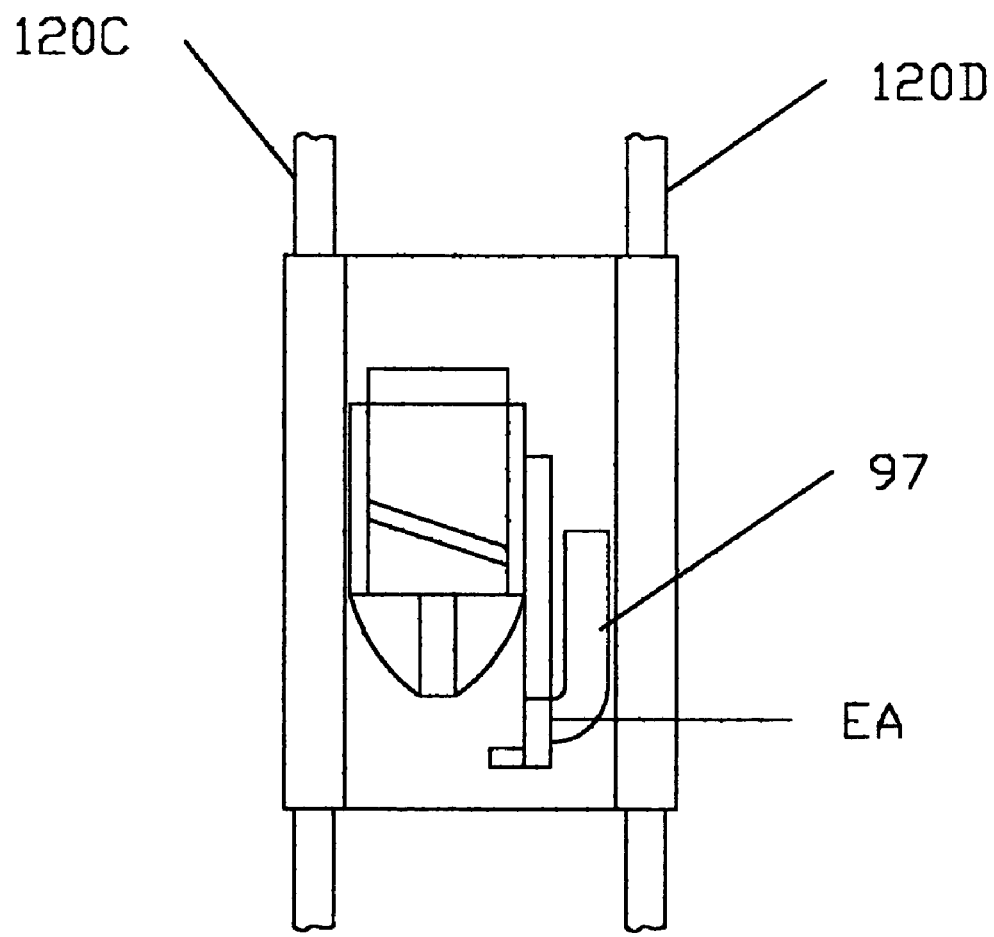
FIG. 19 is a top view of the sawdust collection system consistent with the invention.

FIG. 18 is a side view and FIG. 19 is a top view of a sawdust collection system consistent with the invention. A vacuum port 97 has an entrance axis EA aligned generally perpendicular to a plane defined by the cutting blade 152A and substantially near where the teeth of the blade pass through the top surface of the platform 122A. The vacuum port may be placed about ⅛" to about ½" from the plane defining the circular saw blade 152A.

Although the invention has been illustrated and described in connection with several embodiments, it will be understood that these are merely examples and that those skilled in the art can make numerous modifications and adaptations without departing from the spirit and scope of the invention as defined by the appended claims and equivalents thereof.

We claim:

1. An apparatus for cutting panelized material in two axes, comprising:
   a frame defining a plane having a longitudinal X axis and a lateral Y axis, the frame adapted to support a back surface of the panelized material;
   a guide shelf adjacent to a lower edge of the frame and generally perpendicular to the plane for supporting a side edge of the panelized material to be cut;
   a first guide rail and a second guide rail coupled to the frame, each guide rail aligned generally parallel to the plane and spaced apart from the frame and generally perpendicular to a longitudinal axis of the guide shelf;
   a first movable platform coupled to the first rail for movement parallel to the frame Y axis, the first moveable platform generally parallel to the plane; and
   a second movable platform coupled to the second rail for movement parallel to the frame Y axis;
   a first machining tool comprising a housing pivotably coupled to the first platform at a pivot point, and a biasing mechanism, the biasing mechanism pivotably coupled to the housing and coupled to the first platform, whereby the housing of the first machining tool is moveable via the biasing mechanism between an extended position and a retracted position with respect to the first platform and wherein the biasing mechanism is adapted to apply a first torque on the housing about the pivot point to secure the housing in the extended position and wherein the biasing mechanism is adapted to apply a counter posing second torque on the housing about the pivot point to secure the housing in the retracted position.

2. The apparatus for cutting panelized material of claim 1, wherein the first machining tool further comprises a first cutting blade and a first output shaft, wherein the first output shaft is adapted to axially support the first cutting blade.

3. The apparatus for cutting panelized material of claim 2, wherein the first output shaft rotates about an axis of rotation parallel to the plane and the first output shaft is moveable between an extended position and a retracted position with respect to the plane.

4. The apparatus for cutting panelized material of claim 2, wherein the first cutting blade has a plurality of generally radially oriented teeth spaced about an axis of rotation.

5. The apparatus for cutting panelized material of claim 4, wherein the first cutting blade is moveable between an extended position and a retracted position.

6. The apparatus for cutting panelized material of claim 5, wherein the biasing mechanism is a positioning mechanism coupled between the housing and the first platform, and wherein the biasing mechanism secures the axis of rotation of the first cutting blade in the extended position and the retracted position.

7. The apparatus for cutting panelized material of claim 2, wherein the first output shaft is perpendicular to the plane and rotates about an axis of rotation perpendicular to the plane.

8. The apparatus for cutting panelized material of claim 2, wherein the first machining tool comprises a first electric motor.

9. The apparatus for cutting panelized material of claim 5, wherein the biasing mechanism is a positioning means coupled between the housing and the first platform, and wherein the biasing mechanism secures the axis of rotation of the first cutting blade in a plurality of positions with respect to the plane.

10. The apparatus for cutting panelized material of claim 5, wherein the biasing mechanism comprises a bi-stable mechanism.

11. The apparatus for cutting panelized material of claim 5, wherein in the retracted position, the first cutting blade is spaced from the plane to allow panelized material to be inserted therebetween, and in the extended position at least a portion of the first cutting blade extends through the plane.

12. The apparatus for cutting panelized material of claim 1, wherein the first and second rails are generally parallel to each other.

13. The apparatus for cutting panelized material of claim 1, wherein the first and second guide rails are rigidly secured to the frame.

* * * * *